(12) United States Patent
Li et al.

(10) Patent No.: US 10,936,083 B2
(45) Date of Patent: Mar. 2, 2021

(54) SELF-POWERED GESTURE RECOGNITION WITH AMBIENT LIGHT

(71) Applicant: Trustees of Dartmouth College, Hanover, NH (US)

(72) Inventors: Yichen Li, Hanover, NH (US); Tianxing Li, Hanover, NH (US); Ruchir A. Patel, Hanover, NH (US); Xing-Dong Yang, Hanover, NH (US); Xia Zhou, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 16/591,404

(22) Filed: Oct. 2, 2019

(65) Prior Publication Data

US 2020/0110469 A1 Apr. 9, 2020

Related U.S. Application Data

(60) Provisional application No. 62/740,480, filed on Oct. 3, 2018.

(51) Int. Cl.
| | |
|---|---|
| *G06F 3/01* | (2006.01) |
| *G06F 3/042* | (2006.01) |
| *H01L 27/30* | (2006.01) |
| *H02S 99/00* | (2014.01) |

(52) U.S. Cl.
CPC .............. *G06F 3/017* (2013.01); *G06F 3/042* (2013.01); *H01L 27/301* (2013.01); *H02S 99/00* (2013.01); *G06F 2203/04108* (2013.01)

(58) Field of Classification Search
CPC ...................... G06F 3/017; G06F 3/042; G06F 2203/04108; H02S 99/00
See application file for complete search history.

(56) References Cited

U.S. PATENT DOCUMENTS

| | | |
|---|---|---|
| 2004/0113903 A1 | 6/2004 | Mikami et al. |
| 2005/0271280 A1 | 12/2005 | Farmer et al. |
| 2008/0306700 A1 | 12/2008 | Kawam et al. |

(Continued)

OTHER PUBLICATIONS

International Search Report and Written Opinion dated Jan. 3, 2020, in PCT/US19/54473, 15 pages.

(Continued)

*Primary Examiner* — Gene W Lee
(74) *Attorney, Agent, or Firm* — Oblon, McClelland, Maier & Neustadt, L.L.P.

(57) ABSTRACT

A self-powered module for gesture recognition is presented that utilizes small, low-cost photodiodes for both energy harvesting and gesture sensing. Operating in the photovoltaic mode, photodiodes harvest energy from ambient light. In the meantime, the instantaneously harvested power from individual photodiodes is monitored and exploited as a clue for sensing finger gestures in proximity. Harvested power from all photodiodes is aggregated to drive the whole gesture-recognition module including a micro-controller running the recognition algorithm. A robust, lightweight algorithm is provided to recognize finger gestures in the presence of ambient light fluctuations. Two prototypes are fabricated to facilitate user's interaction with smart glasses and smart watches.

17 Claims, 17 Drawing Sheets

(56) References Cited

U.S. PATENT DOCUMENTS

| | | | | |
|---|---|---|---|---|
| 2012/0187895 A1* | 7/2012 | Hsieh | ............... | H02S 40/38 |
| | | | | 320/101 |
| 2012/0187896 A1* | 7/2012 | Hsieh | ............ | H01L 31/022441 |
| | | | | 320/101 |
| 2013/0147764 A1* | 6/2013 | Chaji | ............... | H01L 27/3227 |
| | | | | 345/175 |
| 2013/0241889 A1 | 9/2013 | Sharma | | |
| 2013/0257815 A1* | 10/2013 | Rattray | ............... | G06F 3/0421 |
| | | | | 345/175 |
| 2016/0098115 A1* | 4/2016 | Ren | ............... | H01L 31/054 |
| | | | | 345/174 |
| 2017/0133938 A1 | 5/2017 | Tiefnig | | |
| 2019/0200439 A1* | 6/2019 | Broers | ............... | H02J 7/35 |

OTHER PUBLICATIONS

Li, Y. et al., "Self-Powered Gesture Recognition with Ambient Light", Department of Computer Science, Dartmouth College, UIST'18, Oct. 2018, 15 pages.

Li, Y. et al., "Self-Powered Gesture Recognition with Ambient Light (UIST 2018)", Video, Youtube, URL:https://youtu.be/GeSoc9CrvVY, Aug. 31, 2018, 7 pages.

* cited by examiner

SELF-POWERED GESTURE RECOGNITION WITH AMBIENT LIGHT

CROSS-REFERENCE TO RELATED APPLICATIONS

This application claims the benefit of priority to provisional application No. 62/740,480 filed Oct. 3, 2018, the entire contents of which are incorporated herein by reference.

STATEMENT OF ACKNOWLEDGEMENT

The inventors would like to acknowledge the support provided under CNS1552924 awarded by the National Science Foundation, for funding this work.

BACKGROUND

Field

The present disclosure is directed to a self-powered device for gesture recognition with ambient light, and in particular a low-power gesture sensing driven by photodiodes that are in a photovoltaic mode.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gestural input is essential for interacting with small wearable devices or smart sensors (Internet of Things). Sensing and processing finger gestures, however, consume power. Limiting the energy footprint of gestural input is essential to bringing it to devices with highly constrained energy budget, or without batteries (e.g., battery-less cell phones, displays, cameras). See Vamsi Talla, Bryce Kellogg, Shyamnath Gollakota, and Joshua R. Smith. 2017. Battery-Free Cellphone. *Proceedings of the ACM on Interactive, Mobile, Wearable and Ubiquitous Technologies* 1, 2: 1-20. doi.org/10.1145/3090090; Christine Dierk, Molly Jane, Pearce Nicholas, and Eric Paulos. 2018. AlterWear: Battery-Free Wearable Displays for Opportunistic Interactions. In *Proceedings of the SIGCHI Conference on Human Factors in Computing Systems*. doi.org/10.1145/3173574.3173794; Tobias Grosse-Puppendahl, Steve Hodges, Nicholas Chen, John Helmes, Stuart Taylor, James Scott, Josh Fromm, and David Sweeney. 2016. Exploring the Design Space for Energy-Harvesting Situated Displays. In *Proceedings of the 29th Annual Symposium on User Interface Software and Technology—UIST '16*. doi.org/10.1145/2984511.2984513; Saman Naderiparizi, Aaron N. Parks, Zerina Kapetanovic, Benjamin Ransford, and Joshua R. Smith. 2015. WISPCam: A battery-free RFID camera. In 2015 *IEEE International Conference on RFID, RFID* 2015. doi.org/10.1109/RFID.2015.7113088; and Shree K. Nayar, Daniel C. Sims, and Mikhail Fridberg. 2015. Towards Self-Powered Cameras. In 2015 *IEEE International Conference on Computational Photography, ICCP 2015—Proceedings*. doi.org/10.1109/ICCPHOT.2015.7168377, each incorporated herein by reference in their entirety.

Prior studies have explored low-power gesture sensing with various sensing modalities (e.g., electric field, TV or RFID signals, pressure, and capacitance), most requiring on-body sensors dedicated solely to gesture sensing. See Gabe Cohn, Sidhant Gupta, Tien-Jui Lee, Dan Morris, Joshua R Smith, Matthew S Reynolds, Desney S Tan, and Shwetak N Patel. 2012. An Ultra-low-power Human Body Motion Sensor Using Static Electric Field Sensing. *Proceedings of the 2012 ACM Conference on Ubiquitous Computing:* 99-102. doi.org/10.1145/2370216.2370233; Artem Dementyev and Joseph A. Paradiso. 2014. WristFlex: Low-Power Gesture Input with Wrist-Worn Pressure Sensors. *Proceedings of the 27th annual ACM symposium on User interface software and technology—UIST '14:* 161-166. doi.org/10.1145/2642918.2647396; Bryce Kellogg, Vamsi Talla, and Shyamnath Gollakota. 2014. Bringing Gesture Recognition To All Devices. *Proceedings of the 11th USENIX Symposium on Networked Systems Design and Implementation (NSDI* 14): 303-316; and Hoang Truong, Phuc Nguyen, Anh Nguyen, Nam Bui, and Tam Vu. 2017. Capacitive Sensing 3D-printed Wristband for Enriched Hand Gesture Recognition. In *Proceedings of the 2017 Workshop on Wearable Systems and Applications—WearSys '17,* 11-15. doi.org/10.1145/3089351.3089359, each incorporated herein by reference in their entirety.

Typical energy density of light is 100 $mW/cm^2$ outdoors and 1 $mW/cm^2$ indoors, which is higher than alternative sources (e.g., radio signals, kinetic energy). See M. A. Cowell, B. P. Lechene, P. Raffone, J. W. Evans, A. C. Arias, and P. K. Wright. 2016. Wireless sensor node demonstrating indoor-light energy harvesting and voltage-triggered duty cycling. In *Journal of Physics: Conference Series*. doi.org/10.1088/1742-6596/773/1/012033; Alexander O. Korotkevich, Zhanna S. Galochkina, Olga Lavrova, and Evangelos A. Coutsias. 2015. On the comparison of energy sources: Feasibility of radio frequency and ambient light harvesting. *Renewable Energy* 81: 804-807. doi.org/10.1016/j.renene.2015.03.065; and R. J. M. Vullers, R. van Schaijk, I. Doms, C. Van Hoof, and R. Mertens. 2009. Micropower energy harvesting. *Solid-State Electronics*. doi.org/10.1016/j.sse.2008.12.011, each incorporated herein by reference in their entirety.

Surplus energy is most significant outdoors, where tens of milliwatts can be harvested under sunlight with 40+ photodiodes (300 $mm^2$ total sensing area).

SUMMARY

In an exemplary embodiment, there is provided a self-powered apparatus that senses multiple types of gestures, including a midair gesture and a touch gesture, the apparatus comprising: a plurality of photovoltaic devices, each operating in a photovoltaic mode and configured to convert ambient light into photocurrent; voltage-reading circuitry connected to each photovoltaic device of the plurality of photovoltaic devices to obtain a voltage reading for the photovoltaic device; energy-harvesting circuitry connected to each photovoltaic device of the plurality of photovoltaic devices to harvest energy to power the self-powered apparatus; and processing circuitry configured to determine that the touch gesture has been made by (1) determining, for each photovoltaic device of the plurality of photovoltaic devices, whether the voltage reading for particular photovoltaic device falls below a first predetermined threshold, and (2) analyzing locations of the photovoltaic devices for which the voltage reading fell below the first predetermined threshold, and determine that the midair gesture has been made by (1)

determining, for each photovoltaic device in a subset of the plurality of photovoltaic devices, whether a midair blockage has occurred for the photovoltaic device, based on the voltage reading for the photovoltaic device, previous voltage readings for the photovoltaic device, and a second predetermined threshold, and (2) analyzing locations of the photovoltaic devices for which the midair blockage has occurred.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
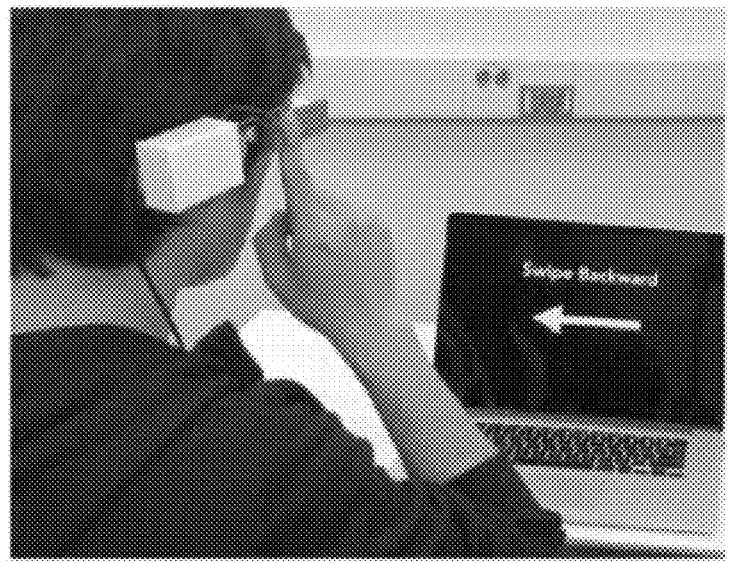
FIGS. 1A and 1B illustrate integrating the prototype with a glasses frame and a watch, where arrays of photodiodes harvest energy while being reused for sensing finger gestures.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

It is one object of the present disclosure to describe energy-constrained or battery-free devices with energy harvesters for both energy harvesting and gesture sensing. Other objectives include exploiting ambient light as the sensing medium and energy source for its ubiquity and high energy density. In some aspects, the disclosed approach relies on arrays of small, low-cost photodiodes as energy harvesters while reusing them for always-on recognition of finger gestural inputs (either via touch or in midair near the photodiodes), without the need of battery sources. As the key departure from many existing light-sensing systems, photodiodes operate only in the photovoltaic mode, thus requiring no input power and only harvesting energy from ambient light. See Parth H. Pathak, Xiaotao Feng, Pengfei Hu, and Prasant Mohapatra. 2015. Visible Light Communication, Networking, and Sensing: A Survey, Potential and Challenges. *IEEE Communications Surveys and Tutorials* 17, 2047-2077. doi.org/10.1109/COMST.2015.2476474; and Thorlab. Photodiode Tutorial, each incorporated herein by reference in their entirety. In the meantime, the disclosed approach monitors the instantaneous power harvested by each photodiode and utilizes it as the clue to recognize finger gestures. Harvested energy aggregated from all photodiodes powers the whole gesture-recognition module including both its sensing and computation components. Surplus energy may further power other components of the device, which is particularly beneficial for battery-free or ultra-low-power devices.

Aspects of this disclosure are directed to an approach that overcomes a technical challenge of uncontrollable ambient light conditions (e.g., light intensity levels, light directions), which often exhibit unpredictable fluctuations caused by user movements or environmental dynamics (e.g., luminary's inherent flickering, clouds passing by, tree leaves waving in the wind). Disclosed embodiments tackle this challenge using an efficient and lightweight recognition algorithm based on constant false alarm rate (CFAR) pulse detection. See C. Scharf, L. L., Demeure. 1991. *Statistical signal processing: detection, estimation, and time series analysis.* Addison-Wesley Reading, Mass., incorporated herein by reference in its entirety. Without the need of training, the algorithm dynamically estimates current ambient light intensity to ensure that finger movements on or near photodiodes can be reliably detected even under a noisy signal background. Additionally, the disclosed embodiments exploit the locality of the finger blockage to mitigate the impact of sudden, drastic changes in ambient light (e.g., lights switching off), which by contrast cause global declines in the harvested energy across all photodiodes and thus can be differentiated from the blockage effect of the finger.

Figure 1B:
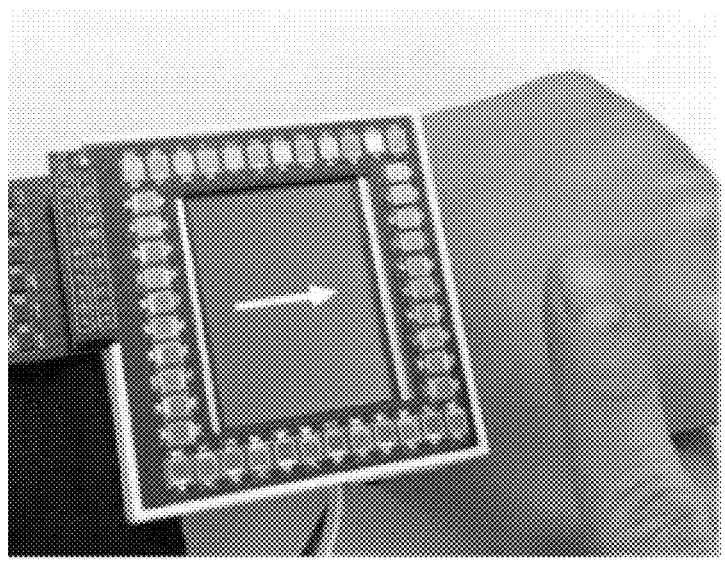

The approach is demonstrated using two prototypes, tailored to interactions on smart glasses and smart watches. FIGS. 1A and 1B illustrate integrating the prototype with a glasses frame and a watch, respectively, where arrays of photodiodes harvest energy while being reused for sensing finger gestures. The watch and glasses were chosen as examples only to ease the prototyping. The disclosed approach is generalizable beyond these examples. The design may be integrated into other battery-free devices. The approach optimizes the circuit designs to minimize the energy overhead of monitoring the harvested energy from each photodiode. The recognition algorithm was implemented on an off-the-shelf micro-controller. With a gesture set of five smart glass gestures and seven smartwatch gestures, the prototypes have been tested extensively under diverse ambient light conditions both indoors and outdoors. Results demonstrate the system's ultra-low power consumption (34.6 µW in the smart glass form factor and 74.3 µW in the smartwatch form factor), while achieving 98.9% (SD=1.7) gesture recognition accuracy across all tested lighting conditions.

Advantages of disclosed embodiments include (1) the concept of a self-powered gesture recognition module, utilizing the harvested energy from photodiodes in the photovoltaic mode for sensing touch and near-range finger gestures; (2) a robust and lightweight gesture recognition algorithm without the need of training; (3) the design and implementation of the system in two wearable form factors; and (4) the results of a series of experiments demonstrating the system's sensing accuracy, energy consumption and harvesting, and robustness in diverse ambient light conditions.

Sensing Principle

Figure 2:
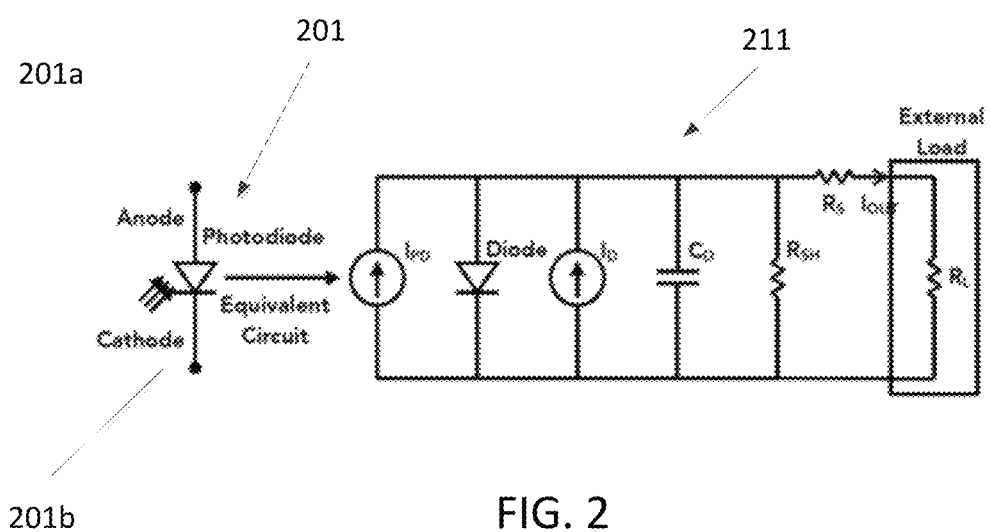
FIG. 2 illustrates the equivalent circuit of a junction photodiode.

A junction photodiode bears the intrinsic characteristics of an ordinary signal diode but differs in that it generates a photocurrent when light strikes the junction semiconductor. FIG. 2 illustrates the inner working of a junction photodiode with its equivalent circuit 211. A photodiode 201 generates a photocurrent, denoted as $I_{PD}$, dark current (leakage current) is $I_D$, and $C_D$ denotes the diode's capacitance. The output current, $I_{OUT}$, is a summation of $I_{PD}$ and $I_D$ and can be converted into a voltage, $V_{OUT}$, with a load resistance, $R_L$.

The junction photodiode 201 operates in one of these two modes:

Photoconductive mode, where an external reverse bias voltage is applied to the photodiode 201 and $V_{OUT}$ is linearly proportional to the incoming light intensity. The reverse bias also reduces diode's capacitance $C_D$, thus lowering the diode's response time. This mode is commonly used for sensing light intensity.

Photovoltaic mode, where zero bias (i.e., no input power) is applied and the photodiode 201 generates a more restricted flow of photocurrent depending on incoming optical power. This mode is the basis for solar cells.

Figure 3A:
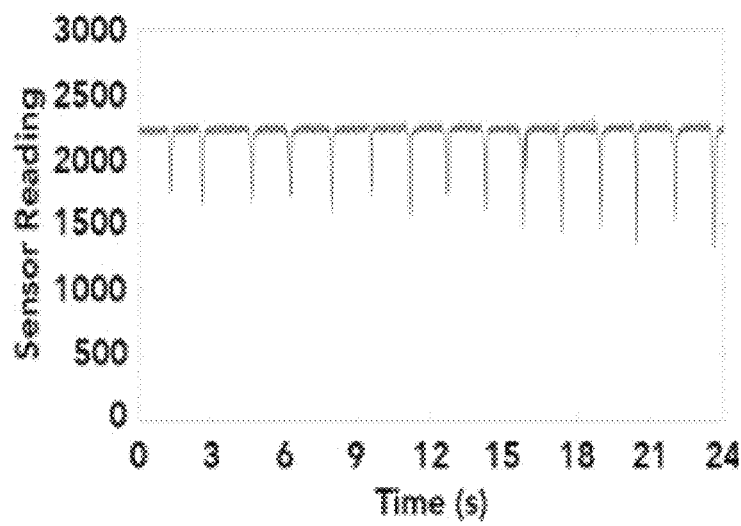
FIGS. 3A and 3B illustrate the time-series of photodiode's harvested power as a finger swipes above it (left) or touches it (right) 12 times.
Figure 3B:
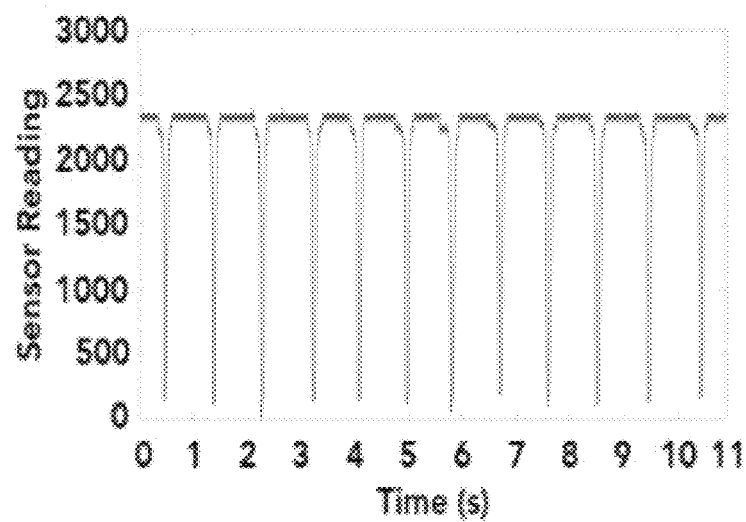

Most prior light sensing systems work with photodiodes in the photoconductive mode. It achieves high sensing responsivity at the cost of external power input. See Parth et al. By contrast, disclosed embodiments focus on diode's photovoltaic mode. It requires no input power while passively harvesting energy from ambient light. The system's sensing principle stems from the fact that the amount of power harvested by a photodiode ($V_{OUT}$) decreases when a near-field object blocks a part of incoming light. As such, monitoring the output power of the photodiode allows us to detect the blockage of the near-field object. As an example, FIGS. 3A and 3B are a graph that plots the change in the power harvested by a photodiode 201 when a user swipes the finger twelve times above (FIG. 3A) or on (FIG. 3B) the diode 201. Here the sensor readings are the output of a 14-bit Analog-to-Digital Converter (ADC; maximum value=16383 for 3.3V). Clearly, as a finger moves in a close range above or directly on an array of photodiodes, it blocks varying subset of photodiodes, causing sharp dips in their harvested power. By monitoring such dips, disclosed embodiments can detect the temporal sequence of blocked photodiodes and thus recognize finger's movement direction or touch trajectory.

Figure 4:
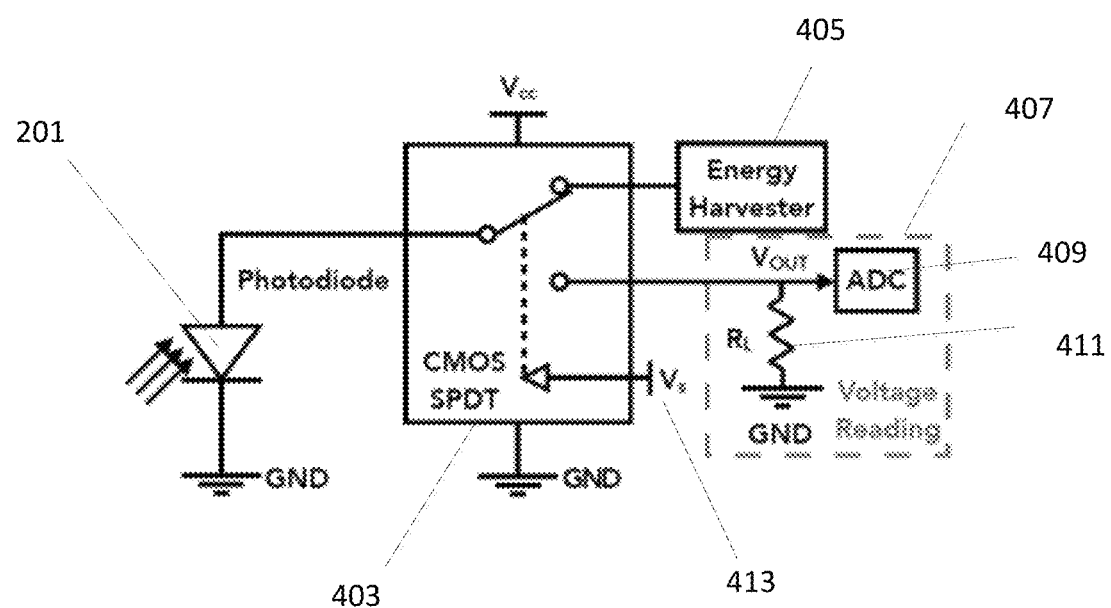
FIG. 4 illustrates the circuit design for reading harvested power from individual photodiodes.

FIG. 4 illustrates the circuit design for reading harvested power from individual photodiodes. Each photodiode 201 is connected to an energy-harvesting circuit 405 for harvesting energy and a voltage-reading circuit 407, e.g., an analog-to-digital converter (ADC) 409 of a micro-controller, for the system to read the amount of harvested power (voltage) from this photodiode 201. The system periodically switches between the two circuits to facilitate sensing and powering using an ultra-low power CMOS single pole double throw (SPDT) switch 403. Regarding FIG. 4, the analog input of the SPDT 403 connects to the output of the photodiode 201 (anode 201a). SPDT's analog output port, controlled by a logic input $V_s$ 413, is used for switching between the energy-harvesting circuit 405 and voltage-reading circuit 407. When $V_s$ 413 is logic HIGH, the photodiode's anode 201a connects to a load resistance 411, allowing an external ADC 409 to read the converted voltage. When $V_s$ 413 is logic LOW, the photodiode 201 connects to the energy-harvesting circuit 405, allowing it to harvest energy together with the other photodiodes. Since reading the voltage takes less than 5 µs, its time overhead is negligible. Therefore, the photodiodes are almost completely devoted to energy-harvesting.

Method

A finger's blocking effect on photodiode's energy harvesting is exploited to recognize finger gestures. Next, the finger gesture set is introduced, followed by the recognition algorithm.

Gesture Set

Figure 5:
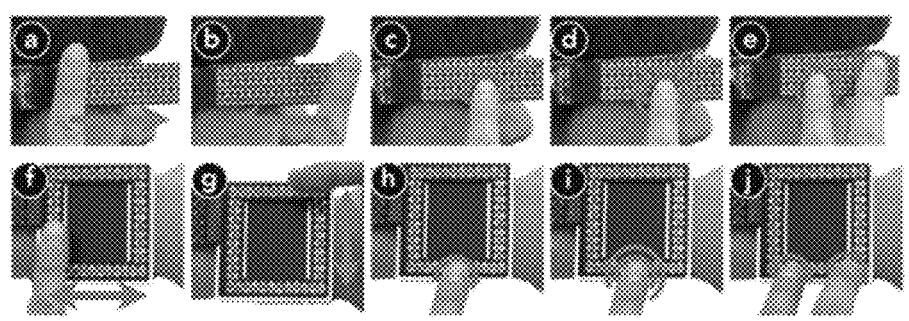
FIG. 5 illustrates the gesture set for the glasses (top) and watch (bottom)

FIG. 5 illustrates the gesture set for the glasses (top) and watch (bottom). Regarding FIG. 5, twelve gestures for interacting with two example wearable devices (smart glasses and watch) may be used. These gestures are chosen from known gesture sets that have been shown to be useful on smart glasses and the watch. See Google. Google Glass Gestures. Retrieved from support.google.com/glass/answer/3064184?hl=en; Apple. Apple Watch Gestures; Huawei. Huawei Smartwatch Bezel Gestures; and Jungsoo Kim, Jiasheng He, Kent Lyons, and Thad Starner. 2007. The Gesture Watch: A wireless contact-free Gesture based wrist interface. In *Proceedings—International Symposium on Wearable Computers, ISWC*, 15-22. doi.org/10.1109/ISWC.2007.4373770, each incorporated herein by reference in their entirety. Specifically, there are five glasses gestures including forward (a) and backward (b) swipes in midair, single tap (c), double tap (d) and double-finger touch (e). The seven gestures on the watch include swipes in four directions in midair (right, left (f), up and down (g)), single tap (h), double tap (i) and double-finger touch (j). Note that the swipe gestures are designed for performing in midair according to Peiris et al. See Anusha Withana, Roshan Peiris, Nipuna Samarasekara, and Suranga Nanayakkara. 2015. zSense: Enabling Shallow Depth Gesture Recognition for Greater Input Expressivity on Smart Wearables. *Proceedings of the ACM CHI'15 Conference on Human Factors in Computing Systems* 1: 3661-3670. doi.org/10.1145/2702123.2702371, incorporated herein by reference in its entirety.

Gesture Recognition

Figure 6A:
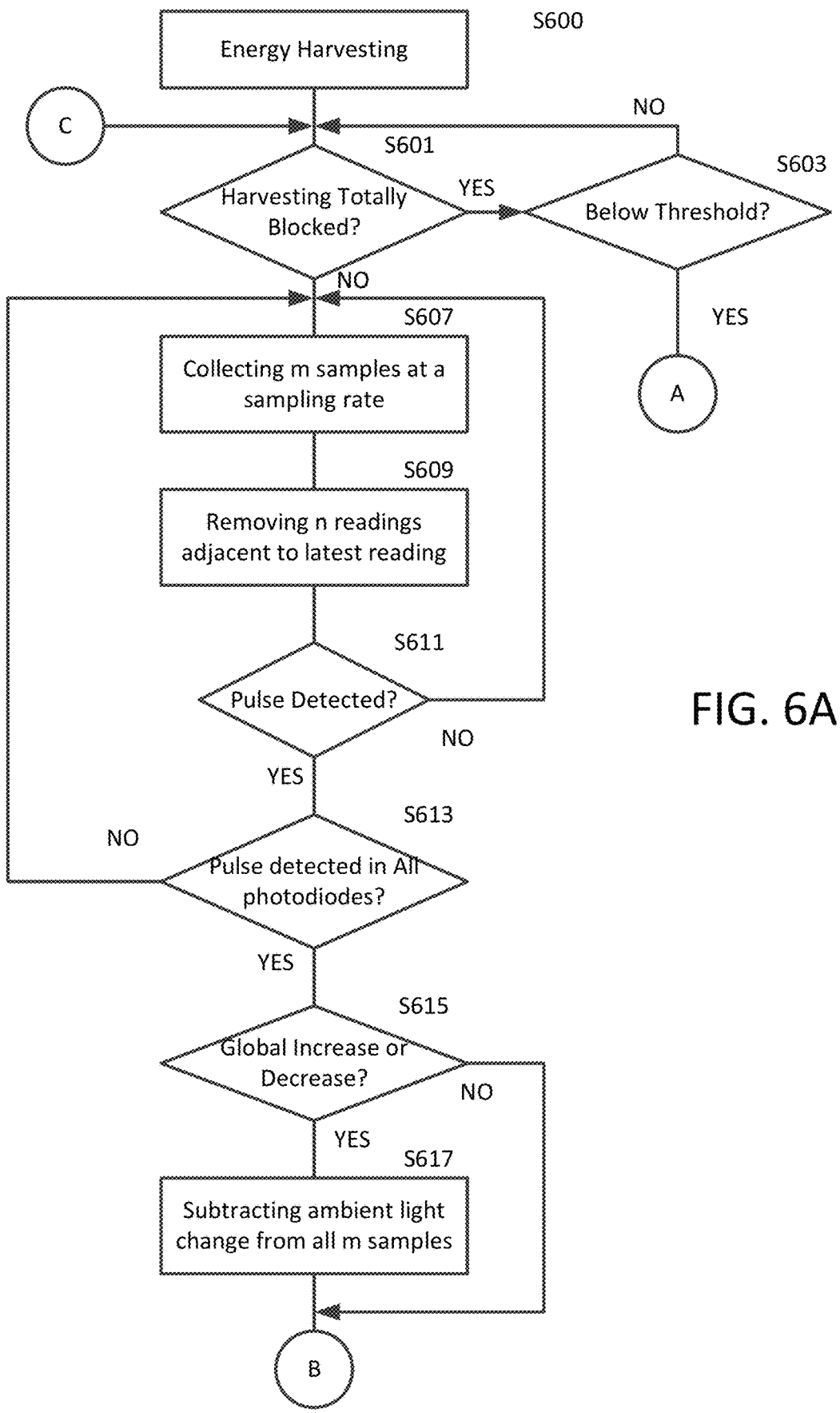
FIGS. 6A and 6B are a flowchart of a gesture recognition algorithm in accordance with an exemplary aspect of the disclosure.
Figure 6B:
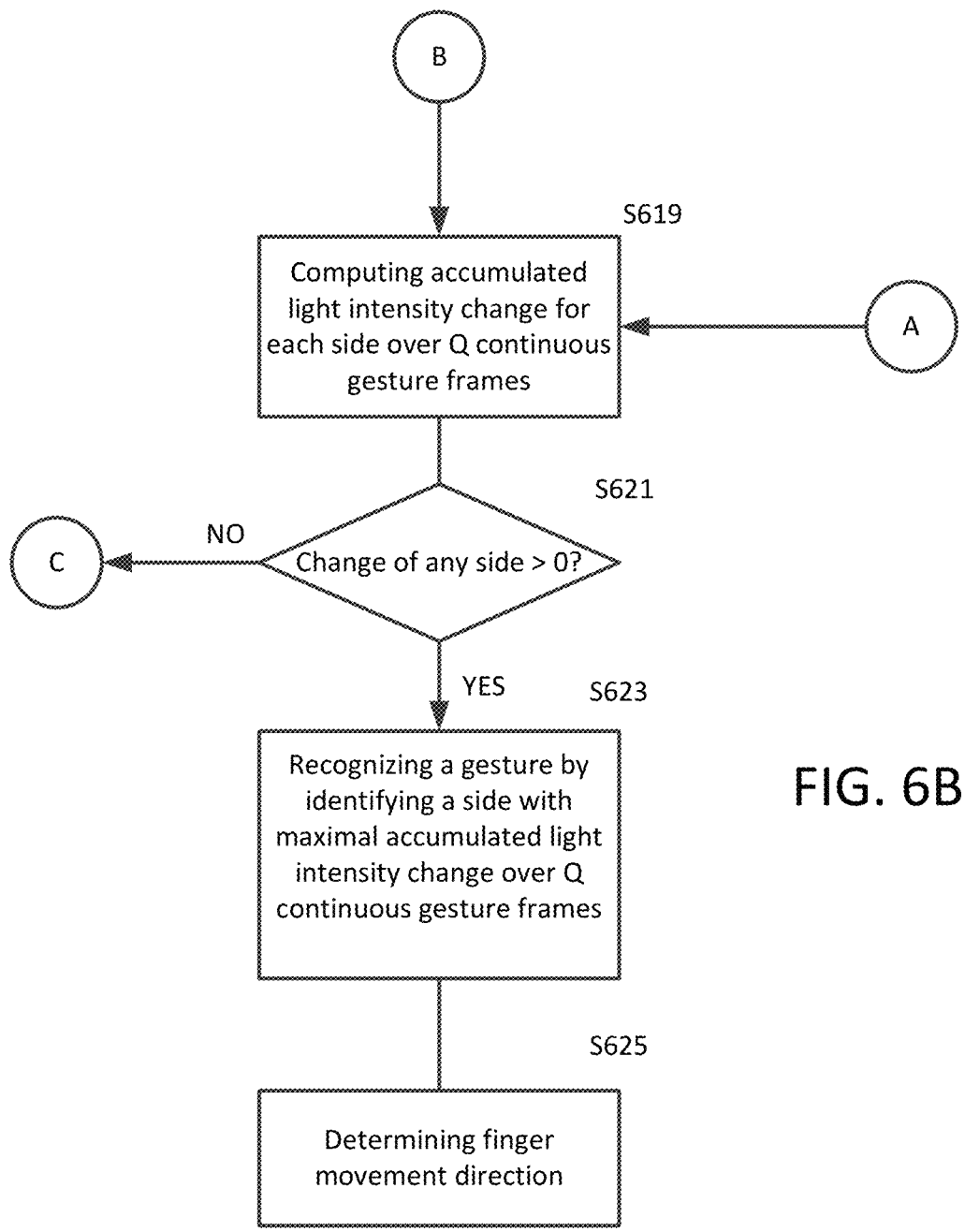

FIGS. 6A and 6B are a flowchart of gesture recognition in accordance with an exemplary aspect of the disclosure. In S600 the energy harvesting circuit 405 performs energy harvesting based on ambient light received in the photodiode 201. In S601 and S603, a touch gesture may be recognized when energy harvesting is totally blocked (YES in S601) and the voltage is below a threshold (YES in S603). Recognizing touch is relatively easy, because touching a photodiode 201 almost completely prevents a photodiode from harvesting power (FIG. 3), regardless of the ambient light condition. Thus, touch detection can be implemented with a fixed threshold (set as ADC 409 output value of 200 in one embodiment).

Figure 7:
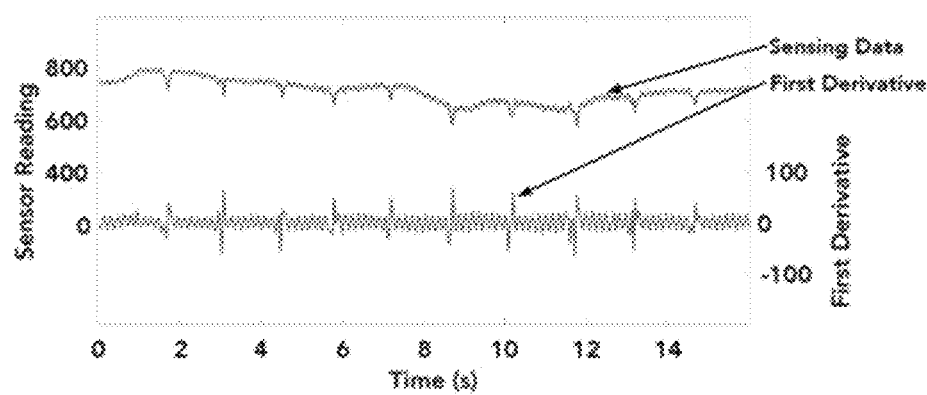
FIG. 7 illustrates the time series of the harvested power of a photodiode. The photodiode is carried by a walking user, who swipes a finger above the photodiode nine times.

Recognizing midair finger gestures, however, is much more challenging in practice, because its blocking effect is more subject to the impact of uncontrolled ambient light conditions. FIG. 7 plots the time series of the power harvested from a photodiode above which a user swiping a finger nine times (see the dips) while walking in a room (300-600 lux). The system observes that harvested power fluctuates over time because of the uneven distribution of ambient light intensity. Thus, using a fixed threshold cannot reliably detect the dips to infer midair finger movement. Similarly, using first-order derivatives also renders a poor accuracy because of light flickering and hardware noise. Various smoothing techniques to reduce noises have also been tested. See John Mulgrew, Bernard, Grant, Peter, Thompson. 2002. *Digital Signal Processing: Concepts and Applications*, incorporated herein by reference in its entirety. These techniques, however, either reduce the signal-to-noise ratio or entail computational overhead unaffordable by the harvested power.

To overcome this challenge and enable reliable detection of the occurrences of midair finger blockage at each photodiode 201, disclosed embodiments relate to a lightweight algorithm based on constant false alarm rate (CFAR). In disclosed embodiments, the lightweight algorithm is performed by processing circuitry of a micro-controller. CFAR detection has been used in a radar system to detect pulses with a constant false alarm rate in noisy environments. See Scharf et al. In brief, it estimates the current noise using m observations around the current measurement. CAFR discards n samples adjacent to the current measurement to avoid current measurement polluting the noise estimation. CFAR is the best fit in solving the problem of recognizing midair finger gestures because with adaptive thresholding, it is robust against environmental noises. Additionally, it entails a negligible computation overhead without the need of any signal smoothing process on the raw sensing data.

Unlike the traditional CFAR algorithm that samples references before and after the current measurement, in S607, processing circuitry considers m reference samples before the current measurement at time t for each photodiode i. In S609, the processing circuitry obtains $R^i$ as a vector of prior readings from photodiode i after removing n readings adjacent to the latest reading, where $R^i = \{s_t^i - m-n, s_t^i - m-n+1, \ldots, s_t^i - n-1\}$ and $s_t^i$ is the reading of $i^{th}$ photodiode at time t. Then, in S611, the processing circuitry detects a pulse (i.e., midair blockage) at a photodiode i if the following condition holds:

$$(s_t^i - \text{mean}(R^i)) > \alpha \cdot (\text{mean}(|R^i - \text{mean}(R^i)|)) \quad (1)$$

α is a threshold factor computed as below, $$\alpha = f^{-1}(1 - P_{fa}) \Big/ f^{-1}\left(\frac{1}{2}\right).$$

where f is the error function, and $P_{fa}$ is the false alarm rate. See P. H. Niemenlehto. 2009. Constant false alarm rate detection of saccadic eye movements in electro-oculography. *Computer Methods and Programs in Biomedicine* 96, 2: 158-171. doi.org/10.1016/j.cmpb.2009.04.011, incorporated herein by reference in its entirety.

In an exemplary implementation, m, n, and $P_{fa}$ are set as 16, 8, and 7%, respectively. f is set as a Gaussian error function based on the measurements.

Since the noise estimation is based on a few reference samples (e.g., 16), the estimation results may not be accurate when ambient light drastically changes within these reference samples. Such sudden ambient light change, however, leads to a global change (drop or rise) in the harvested power across all photodiodes. By contrast, a finger blocks only a subset of photodiodes. Thus, in S613, once pulses are detected at all photodiodes YES), the processing circuitry can infer that a global light change occurs (YES in S615). If it is a global increase in light intensity, then the photodiode experiencing the largest increase is not blocked by the finger and its change reflects the ambient light change ΔL. If it is a global decrease, then the photodiode with the smallest decrease is not blocked by the finger and hence its change reflects ΔL. Then, in S617, the processing circuitry subtracts ΔL from all reference m samples before the sudden light change so that the finger blockage can be correctly detected.

After detecting each photodiode's blockage status, the processing circuitry their statuses are aggregated to recognize finger midair gestures. Specifically, finger gestures considered along N sides of a device (e.g., N=4 for a watch bezel and N=1 for a glasses frame). For each side with photodiodes, the maximal light intensity change is calculated as below:

$$L_u = \max_{j \in P_u}(l_j),$$

$$\text{where } l_j = \begin{cases} |s_t^j - \text{mean}(R^j)|, & \text{if condition (1) holds} \\ 0, & \text{otherwise} \end{cases}$$

The processing circuitry leverages Q continuous gesture frames that contain maximal light intensity changes for gesture recognition. To do so, in S619, the processing circuitry first computes the accumulated light intensity change for each side of the device. A potential gesture frame (either touch or midair) is detected if any side is larger than zero (YES in S621). For a non-gesture frame, all sides remain zero (NO in S621). Then, in S623, the processing circuitry recognizes the side on which the gesture is performed by identifying one with the maximal accumulated light intensity change. In S625, the processing circuitry may determine a finger's movement direction based on the index of the first and last blocked photodiode within the Q gesture frames.

To ensure energy efficiency, set nonuniform sampling rates across photodiodes. For midair gestures, the system only acquires the voltage information from a small set of photodiodes, as the blockage information is sufficient to derive finger midair motion above the photodiodes. In this case, voltage data is sampled at a higher frequency (35 Hz), since midair gestures are performed fast (e.g., less than 0.1 s) and the duration of the finger moving across a photodiode can be as short as tens of milliseconds. In contrast, identifying the photodiode(s) that are in contact with the finger(s) requires reading from every photodiode. However, since swiping across a photodiode using touch is slower (e.g., 50 ms) than in the midair, the sampling rate can be lower (17 Hz in the implementation).

Prototypes

Figure 8:
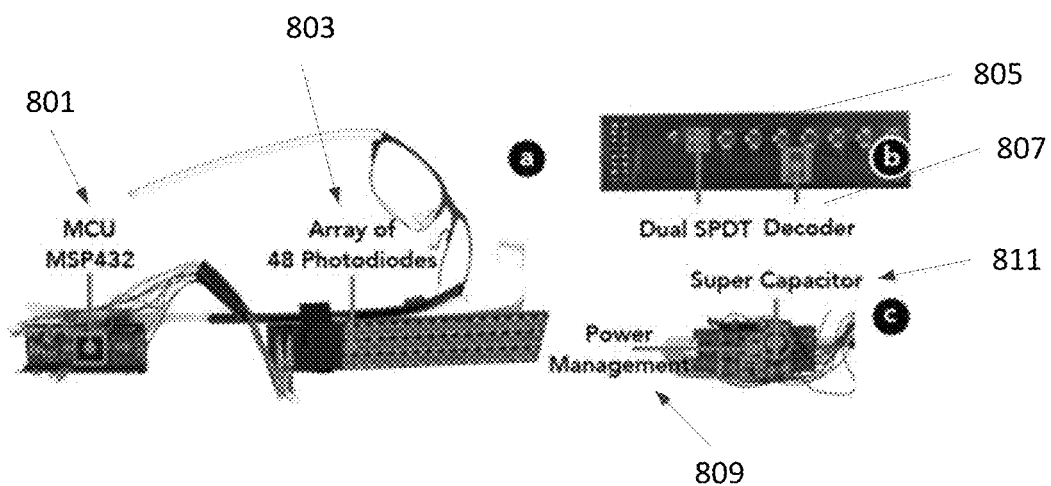
FIG. 8 illustrates integrating the prototype with Google Glass.
Figure 9:
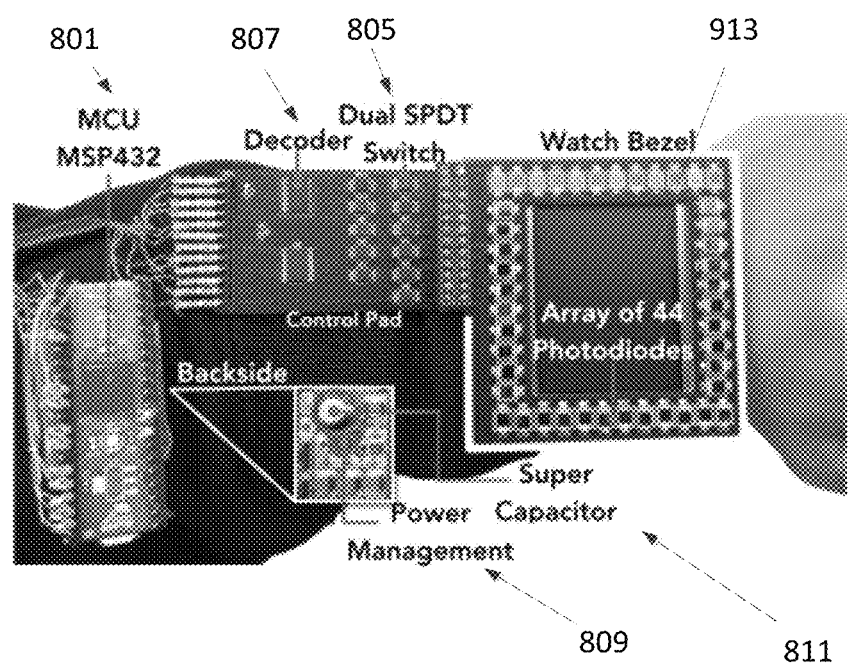
FIG. 9 illustrates integrating the prototype with a smart watch.
Figure 10:
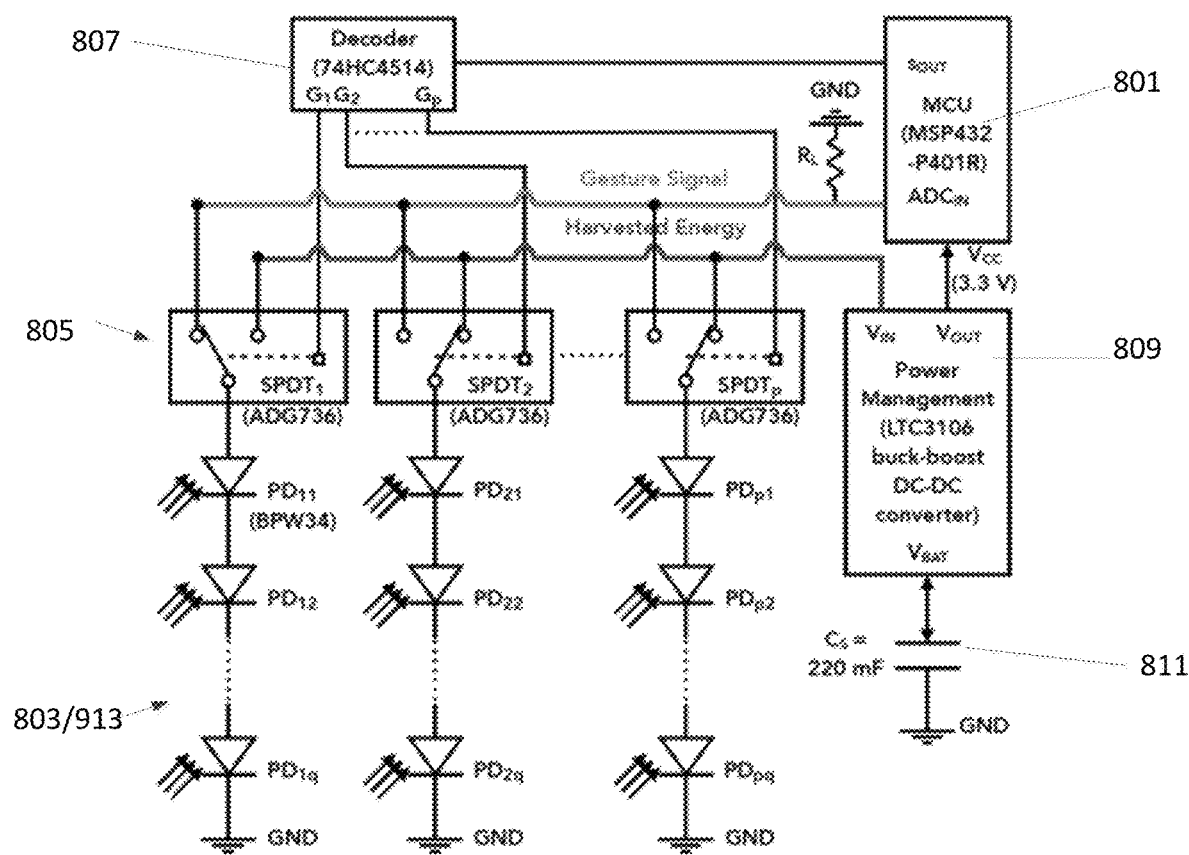
FIG. 10 illustrates the schematic of the prototype, where q photodiodes are wired in series as a group connecting to a switch, and p photodiode groups are wired in parallel, connecting to the power management, decoder, and microcontroller.

Two prototypes have been built using off-the-shelf hardware, considering interaction with smart glasses and a smart watch as examples (FIG. 8 and FIG. 9). Note that the watch screen in FIG. 9 is only for visualizing the recognition results from the prototype and it is powered by an external power supply. Each prototype consists of arrays of photodiodes, control circuits for switching between energy harvesting and voltage reading, and a micro-controller. FIG. 10 illustrates the schematic. Next, an explanation of each component is provided in detail.

Photodiodes and Control Circuits

Off-the-shelf silicon PIN photodiodes 803, 913 were chosen (Osram BPW34), providing 21% energy conversion efficiency and measured 2.7×2.7 mm in size. See BPW34. www.osram.com/os/ecat/DIL%20SMT%20BPW%2034%20S/com/en/class_pim_web_catalog_103489/global/prd_pim_device_2219543/, incorporated herein by reference in its entirety. Photodiodes can be wired in series or in parallel. The output voltage is equal to the summation of each photodiode in the former, and the minimum voltage across photodiodes in the latter. In the experiment, each photodiode provides 350 mV (900 nm, 1 mW/cm$^2$) output voltage. It is below the start voltage of the energy harvester, which is 850 mV without a backup source (e.g., super-capacitor) and 300 mV with a backup source. Therefore, multiple (2 or 3) photodiodes are connected in series as a unit and then these units are connected in parallel (as shown in FIG. 10). The total harvested power remains the same, independent of how the photodiodes are wired.

An ultra-low power dual SPDT switch 805 (ADG 736) is chosen to link the photodiode to an energy harvester or ADC. See ADG736. www.analog.com/media/en/technical-documentation/data-sheets/ADG736.pdf, incorporated herein by reference in its entirety. ADG 736 has two SPDT units and can control two photodiodes respectively. SPDT units are controlled by a low-power 16-channel decoder 807 (74HC4514). See 74HC4514. www.ti.com/lit/ds/schs280c/schs280c.pdf, incorporated herein by reference in its entirety.

Printed circuit boards (PCB) were designed and fabricated to host photodiodes and control circuits. For the smart glasses (FIG. 8), the PCB board is a thin (1.6 mm) two-layer board that hosts 16×3 photodiodes 803 on the front and control circuits on the back, in particular, three photodiodes in a column form a unit, controlled by a SPDT switch 805 on the back. The PCB is attached to the side arm of a Google Glass. For the smart watch (FIG. 9), two customized PCBs were fabricated. The first PCB is a two-layer board that hosts 44 photodiodes 913 and two photodiodes form a unit, providing 22 channels for reading harvested voltages. This PCB surrounds the watch screen and its outputs connect to the second board, which is a 4-layer PCB with 11 duel SPDT switches 805 and two 16-channels decoders 807. The additional decoder only requires one more port from the micro-controller 801.

For both prototypes, all units are used for detecting touches while a subset of units are used for detecting midair gestures. Specifically, only 4 units (column 1, 5, 9 and 13) are used in the glasses scenario while 11 units uniformly sampled are used in the watch scenario.

The harvested power fluctuates due to user's mobility and ambient light variations. To maintain a stable power output, the power management component 809 is a buck-boost DC/DC converter (LTC3106) combined with a super-capacitor 811 (0.22 F) as shown in FIG. 10. See LTC3106. www.analog.com/en/products/power-management/energy-harvesting/ltc3106.html, incorporated herein by reference in its entirety. The super-capacitor 811 stores surplus energy to supply the system when the harvested energy is lower than the requirement (e.g., in low light conditions).

Micro-Controller

An ultra-low-power micro-controller 801 (MINI-M4 for MSP432 board) is used to control the decoder 807, digitize output voltage of each photodiode 803, 913 and recognize finger gestures. See MINI-M4 for MSP432. www.mikroe.com/mini-msp432, incorporated herein by reference in its entirety. The MSP432P401R micro-controller 801 is used in three modes: 1) LPM3 mode (660 nA/3.3V, CPU idle); 2) active mode (80 µA/MHz/3.3V, 48 MHz clock) running CFAR; and 3) ADC_DMA mode (1.4 mA/3.3V, 25 MHz clock) controlling the decoder 807 and sampling voltage number. See MSP432P401R. www.ti.com/lit/ds/symlink/msp432p401r.pdf, incorporated herein by reference in its entirety. The micro-controller 801 is in the active mode for 0.14% (glasses) and 0.36% (watch) of the time, in the ADC_DMA mode for 0.28% (glasses) and 0.39% (watch) of the time, and in the LPM3 mode otherwise. Given that an ADC conversion takes 5 µs, collecting voltage numbers from all units takes 80 µs on the glasses and 110 µs on the watch. Thus, photodiodes harvest power in more than 99.5% of the time.

The micro-controller 801 runs the gesture recognition algorithm (FIGS. 6A and 6B) to output detected gesture. The measurements show that the recognizing a gesture takes 10 µs on the glasses prototype and 30 µs on the watch. To minimize the power consumption, unrelated units (e.g., USB bridge chip and LED indicators) may be removed on the board. To further reduce the computation overhead, all of the multiplications and divisions may be replaced with shift operations, since the multipliers and dividers are factor of two. The energy harvested by photodiodes powers the whole system, including SPDT switches 805, decoders 807 and the micro-controller 801.

Study 1: Recognition Accuracy

First, gesture recognition accuracy is examined.

Participants

Ten participants (9 males, age: min=20, max=33, mean=24.2) were recruited in this study. All of them are right-handed. The diameters of participants' index fingers range from 12 mm to 17.5 mm (SD=1.5) and that of the middle fingers are between 12.5 mm and 17 mm (SD=1.1).

Data Collection

Data collection is carried out in an office room (4.5 m×5.6 m), which has 6 fluorescent lights on the ceiling. Participants perform the task in a sitting position at a desk, 2 m below the ceiling. Light intensity is measured using a LX1330B light meter. The average light intensity around the photodiodes of the glasses is between 472 and 544 lux (SD=21.1), depending on the participant's height. The light intensity at the watch face is between 860 and 933 lux (SD=23.9), depending on the position of participants' hand.

Prior to the start of the study, participants are given several minutes to practice the gestures. During the study, participants perform the gestures using the right hand in their normal speed. In the watch scenario, participants rest the left arm on the desk and use the right hand to perform the gestures. For both the watch and glasses, touch is performed directly on the photodiodes whereas midair gestures are performed with the finger at roughly 0.5 cm to 3 cm distance to the photodiodes. Each gesture is repeated 20 times. A five-minute break was given between the glass and watch scenarios. In total, 2400 gesture instances (10 participants× 12 gestures×20 repetitions) have been collected for analysis.

Result

Recognition accuracy is measured using precision and recall. See Michael Buckland and Fredric Gey. 1994. The relationship between Recall and Precision. *Journal of the American Society for Information Science* 45, 1: 12-19.

doi.org/10.1002/(SICI)1097-4571(199401)45:1<12::AID-ASI2>3.0.CO; 2-L, incorporated herein by reference in its entirety. Precision is the percentage of the correctly recognized gestures among all the detected gestures. Recall is the percentage of the correctly recognized gestures among the entire gesture set (e.g., 20 for each gesture in the dataset).

Figure 11A:
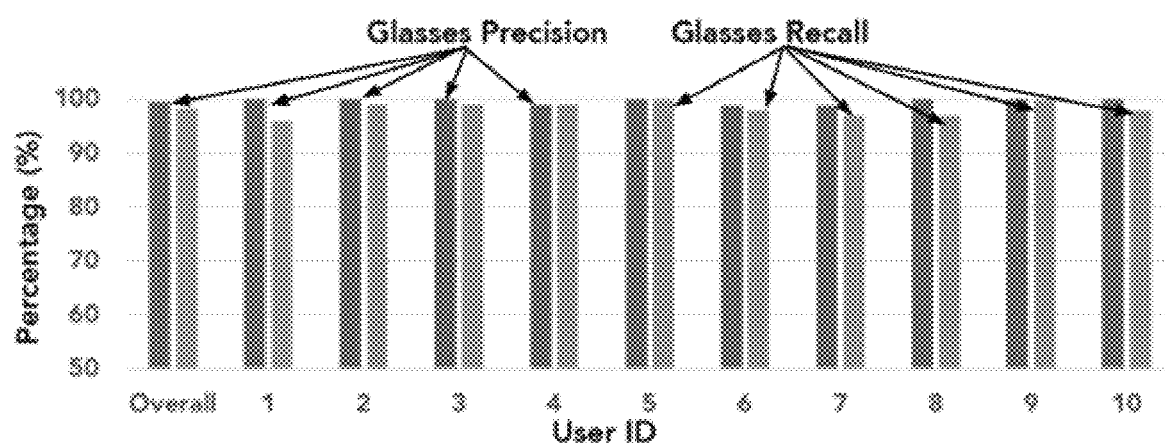
FIGS. 11A and 11B illustrate the precision and recall of gesture recognition across participants.
Figure 11B:
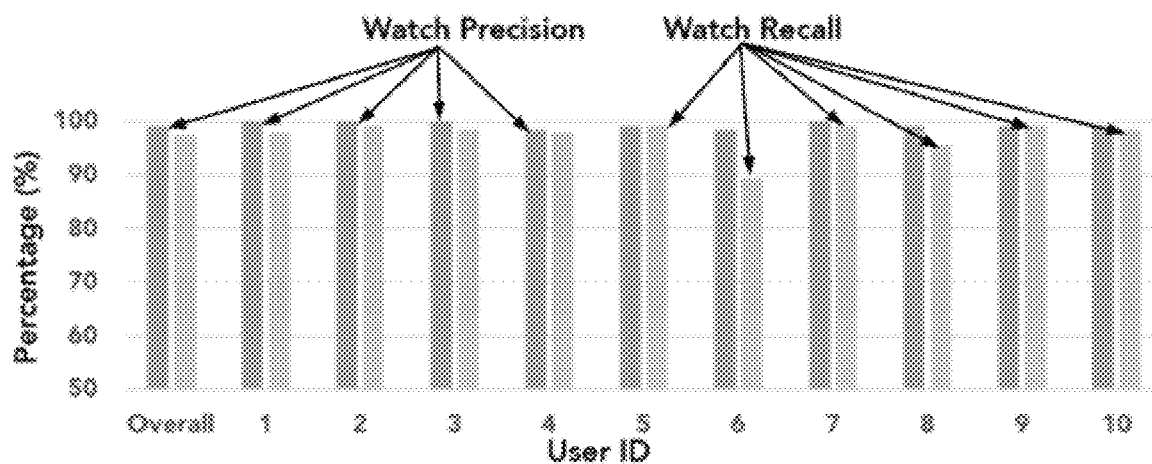

The precision and recall for the glasses is 99.7% and 98.3%, respectively. The precision and recall for the watch is 99.2% and 97.5%, respectively. FIGS. 11A and 11B show the result per participant for the glasses (FIG. 11A) and for the watch (FIG. 11B) and the precision and recall averaged across all the participants as the 'overall' bar. The recall rate for P6 is the lowest. This is because P6 occasionally performs the gestures more than 3 cm away from the photodiodes, resulting into incorrect recognitions of some midair gestures.

Figure 12A:
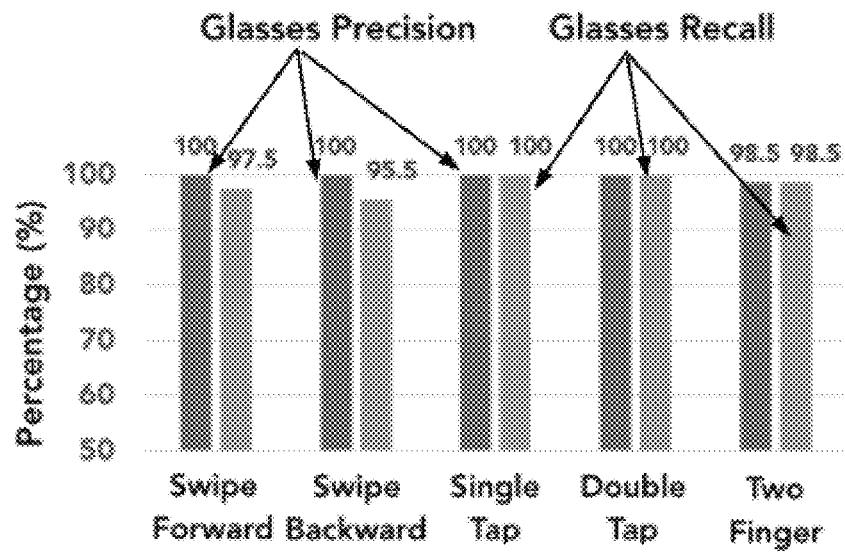
FIGS. 12A and 12B illustrate the recognition accuracy across finger gestures.
Figure 12B:
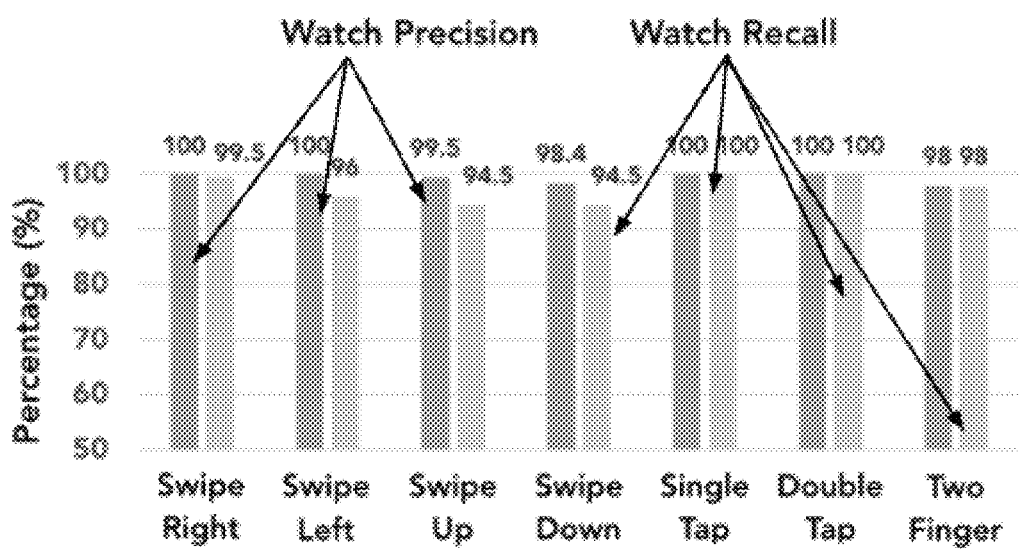

Recognition accuracy across different gestures is shown in FIGS. 12A and 12B. As expected, touch gestures (e.g., tap) receive the highest accuracy (precision=99.5%, recall=99.5%). This is primarily attributed to the significant impact of touch on harvested energy. When a finger touches the photodiodes, the energy harvested from the photodiode drops to somewhere near zero (not zero due to the dark current) allowing the gestures to be easily detected. The recognition accuracy of midair gestures is higher with the glasses than the watch, where the precision/recall is 100%/96.5% for the glasses and 99.5%/96.1% for the watch. This is partially because the glasses has a smaller set of 1D gestures whereas the gesture set for the watch is larger, including both 1D and 2D gestures.

The impact of gesture speed on recognition accuracy is analyzed. From the results of participants gesturing in various speeds, noticeable differences in accuracy were not caused by gesture speed. The reason is that given the length of the photodiode array (7.1 cm for the glasses, 5.4 cm for the watch) and the ADC rate (35 Hz), the fastest swiping speed the system can handle is 245 cm/s (glasses) and 189 cm/s (watch), far above the normal gesture speed. Thus, the system maintains its recognition accuracy under various normal speeds of gesturing.

Study 2: Power Consumption and Harvesting

Next the power consumption is examined in the prototypes and their ability to harvest energy in various ambient light conditions.

Power Consumption

The power consumption of the prototypes is estimated using a Monsoon power monitor, averaged over 10-second intervals for five testing rounds. See Monsoon. msoon.github.io/powermonitor/PowerTool/doc/Power%20Monitor%20Manual.pdf, incorporated herein by reference in its entirety. As shown in Table 1, the overall power consumption for gesture recognition is 34.6 µW for the glasses and 74.3 µW for the watch. The watch consumes more power because the device has more photodiodes. The gesture set of the watch contains more 2D gestures that entail slightly higher computational overhead to recognize. For both prototypes, 94-95% of the power is consumed by the micro-controller running the recognition algorithm and by the built-in ADC acquiring voltage data (30-40% of the power). The micro-controller consumes less than 5 µW in the sleep mode (LPM3 mode) when no gesture is detected.

It is possible to replace the ADC with ultra-low-power comparators (e.g., TS881) to further improve energy efficiency. See TS881. www.st.com/resource/en/datasheet/ts881.pdf, incorporated herein by reference in its entirety. Moreover, the photodiodes do not consume any power and their control circuits (e.g., SPDT switches, decoder) also consume negligible power.

TABLE 1

Breakdown of power consumption for two prototypes.

|  | MCU-ADC | MCU-Recognition | Control Board | In Total |
| --- | --- | --- | --- | --- |
| Glasses | 13.6 uW | 19.2 uW | 1.8 uW | 34.6 uW |
| Watch | 22.5 uW | 48.3 uW | 3.5 uW | 74.3 uW |

Energy Harvesting

A study was conducted to measure the amount of energy the prototypes can harvest in various ambient light conditions. A participant (188 cm tall) is recruited for the study, where participant is asked to wear the devices in a sitting and standing position. The amount of the energy harvested by the devices is measured in four indoor lighting conditions and three outdoor lighting conditions. The indoor lighting conditions include: 1) a dark room (200 lux); 2) normal office lighting (600 lux); 3) bright lab condition (1K lux), and 4) next to a lab window during noon (2K lux). The outdoor lighting conditions include: 1) in the shadow of a tall building (4K lux); 2) under direct sunlight in a cloudy day (20K lux), and 3) under direct sunlight in a sunny day (110K lux). When standing, participant is asked to occasionally raise the wrist to the front of the chest to mimic the situation where a user is interacting with the device with photodiodes facing the sky or ceiling. When the wrist is not held in front of the chest, photodiodes face outside the body. When sitting, participant rests the arm on a table of 70-cm height.

Table 2 shows the results of all the tested conditions. In the indoor conditions, the power harvested by the devices ranges from 23 µW to 124 µW. Even though the glasses prototype contains more (48) photodiodes than the watch, it harvests slightly less power in most conditions because the light to the glasses often comes from larger incident angles. In the outdoor conditions, the amount of power harvested by both devices is significantly higher, ranging from 1.3 mW to 46.5 mW. This is because sunlight contains more infrared light, which photodiodes can convert to energy more efficiently. Overall, the result shows that the energy harvested by the prototypes is sufficient to power the entire gesture recognition module except when participant is in the sitting position in the dark room. This problem can be mitigated by the supercapacitor in the prototypes, with which surplus energy harvested in other conditions is stored to power the system in situations when the harvested energy is insufficient. Filling in this power gap (11-33 µW) for one hour needs a user to stay outdoors for 26-91 seconds in shadow, or 5-15 seconds in a cloudy day (20K lux) or 1-3 seconds under direct sunlight (110K lux).

TABLE 2

Harvested energy in various ambient light conditions.

| | Indoor | | | | Outdoor | | |
| --- | --- | --- | --- | --- | --- | --- | --- |
| | Light Condition (lux) | | | | | | |
| | Dark Room (200) | Normal Office (600) | Bright Lab (1K) | Near Window (2K) | Shadow (4K) | Cloudy (20K) | Direct Sunlight (110K) |
| Glasses Sitting | 23 uW | 48 uW | 62 uW | 332 uW | — | — | — |
| Glasses Standing | 44 uW | 89 uW | 115 uW | 346 uW | 1.5 mW | 8.6 mW | 46.5 mW |
| Watch Sitting | 41 uW | 76 uW | 110 uW | 306 uW | — | — | — |
| Watch Standing | 62 uW | 91 uW | 124 uW | 315 uW | 1.3 mW | 7.8 mW | 41.8 mW |

Study 3: System Robustness

Finally, system robustness is examined against diverse ambient light conditions. Since recognizing touch is quite robust (e.g., 99.5% for both precision and recall) against all the tested conditions, only midair gestures were tested in this study. In each of the tested lighting condition, 100 gesture instances (5 gestures×20 repetitions) have been collected for the glasses and 140 gesture instances (7 gestures×20 repetitions) for the watch. Next, results are presented.

Stable Ambient Light

First devices were tested under a stable ambient light condition, i.e., no sharp change in light intensity. The impact of the intensity and direction of ambient light was examined on recognition accuracy.

Varying Intensity Level

Six different levels of light intensity were tested, including three indoor conditions: dark room (200 lux), normal office (600 lux) and bright lab (1K lux), and 3 outdoor conditions: under shadow (4K lux), under cloud (20K lux) and direct sunlight (110K lux). Also the watch prototype was tested with no ambient light (0 lux). In this condition, the systems rely on the screen light reflected by the finger.

Figure 13A:
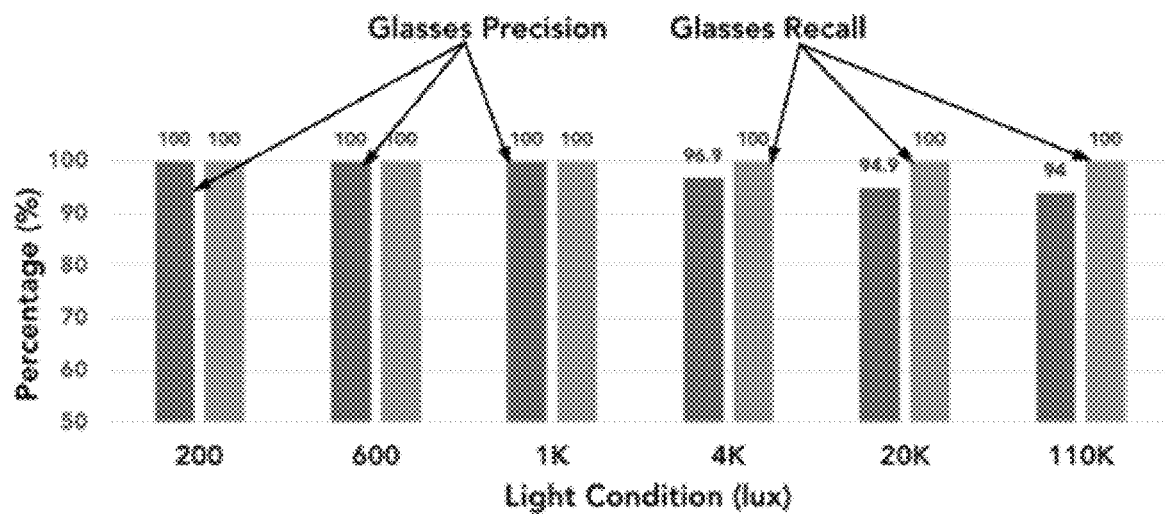
FIGS. 13A and 13B illustrate the accuracy of gesture recognition under different levels of ambient light intensity.
Figure 13B:
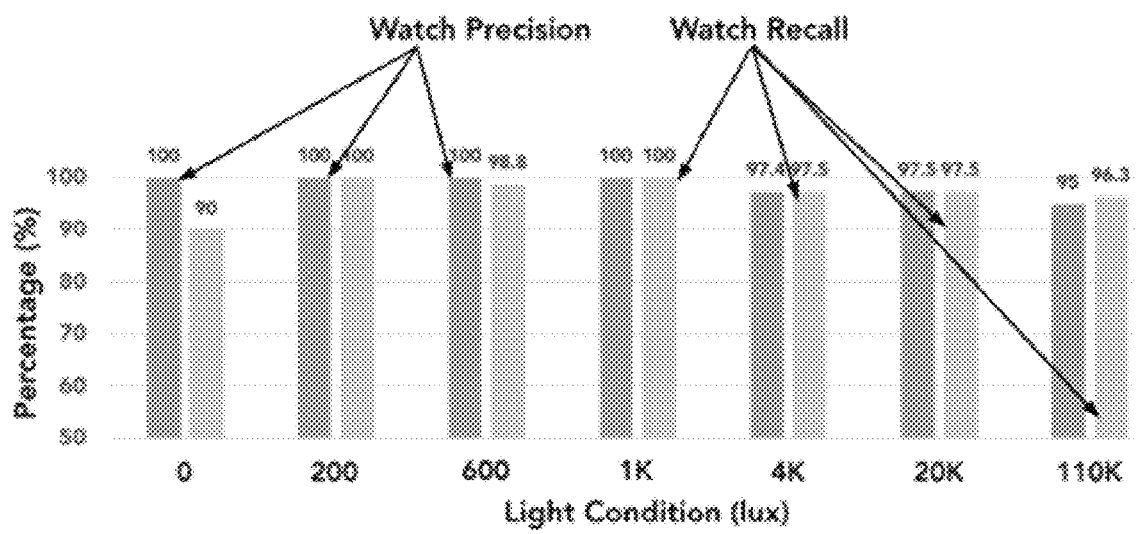

FIGS. 13A and 13B illustrate the accuracy of gesture recognition under different levels of ambient light intensity. Both prototypes achieve high precision (100%) and recall (99.8%) in the indoor conditions. The precisions for the outdoor conditions are slightly lower (94.9% for the glasses and 97.5% for the watch because of higher fluctuated noises from sunlight. As for the case with no ambient light, the devices achieve a precision of 100%, solely depending on the screen light reflected from the finger. In this case, the CFAR method detects power rises, instead of dips to identify the blocked photodiodes for gesture recognition. The recall for the no-light condition is slightly lower (90%) because the intensity of the reflected light is not sufficient enough to guarantee a significant impact on the harvested energy. Overall, the result suggests that CFAR is effective for detecting the tested finger gestures in various levels of ambient light intensity.

Varying Light Direction

Also, the robustness of the system was tested under varying light directions. In this study, the direction of incoming light was varied using a floor lamp. For the glasses, the lamp is placed at three angles to the photodiodes (−45°, 0° and +45°). When the lamp is placed at 0° angle, it faces directly to the photodiodes. For the watch, the lamp was placed in four directions (Forward, Left, Right and Above). Light intensity on the watch face is around 300 lux.

Figure 14A:
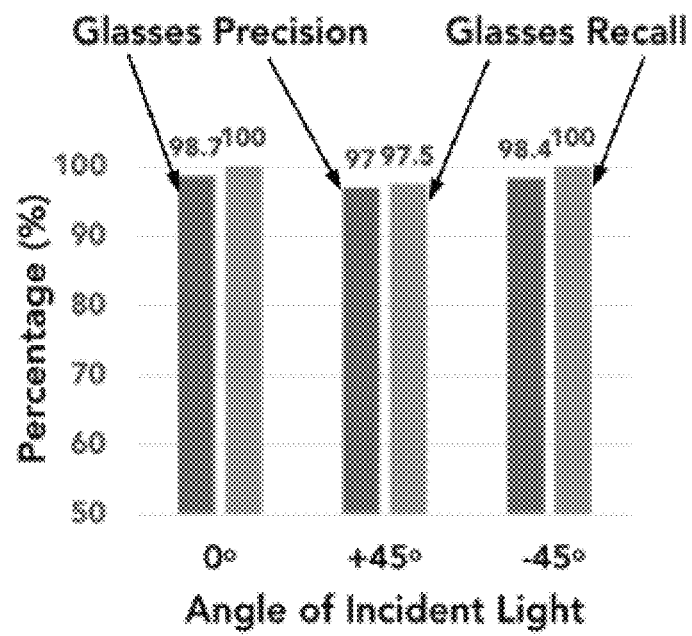
FIGS. 14A and 14B illustrate the accuracy of gesture recognition under ambient light in varying directions.
Figure 14B:
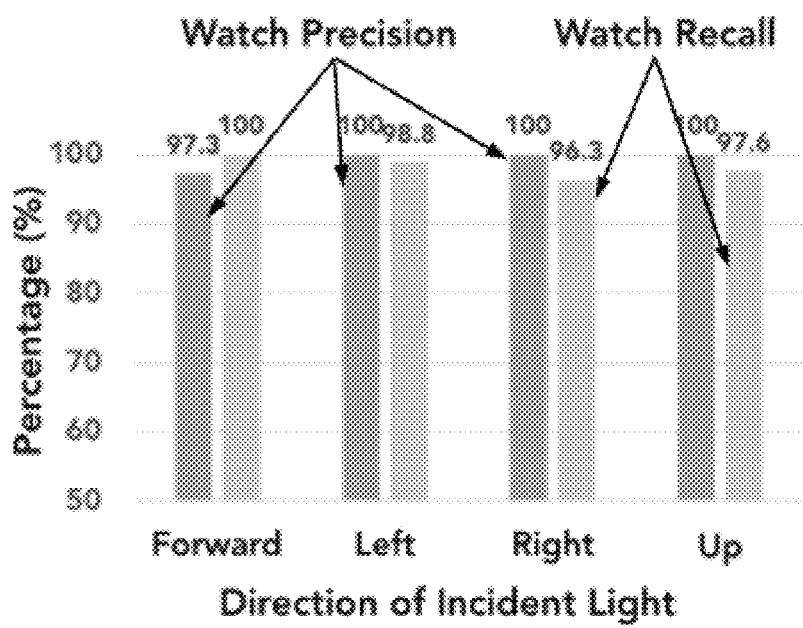

FIGS. 14A and 14B illustrate the accuracy of gesture recognition under ambient light in varying directions for both prototypes. The gesture recognition accuracy for the glasses remains high (98.1% precision and 99.2% recall) across all directions, since the direction of the incoming light has little impact on the sequence in which the 1D array of photodiodes are blocked. The watch receives slightly lower recall (96.3-98.8%) when the light comes from the Left or Right. This is because the shadow of the finger occasionally lands outside the photodiodes when the finger swipes up or down. In this case, the system does not sense any voltage change. The same effect appears when swiping the finger left or right with the light coming from Front. Additionally, when light comes from the right side of the device, the shadow of the moving finger can affect certain photodiodes and interfere with the sensing of finger motion, and vice versa for left-handed users. Overall, the results show that both prototypes can maintain high precision/recall in all the tested lighting directions.

Dynamic Ambient Light

Figure 15A:
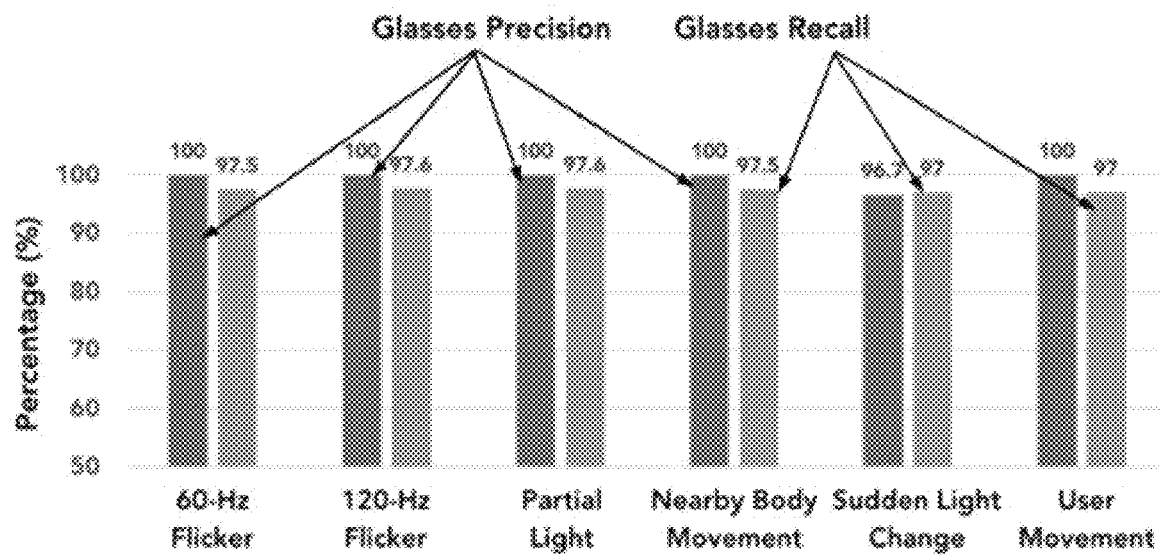
FIGS. 15A and 15B illustrate the accuracy of gesture recognition under ambient light fluctuations.
Figure 15B:
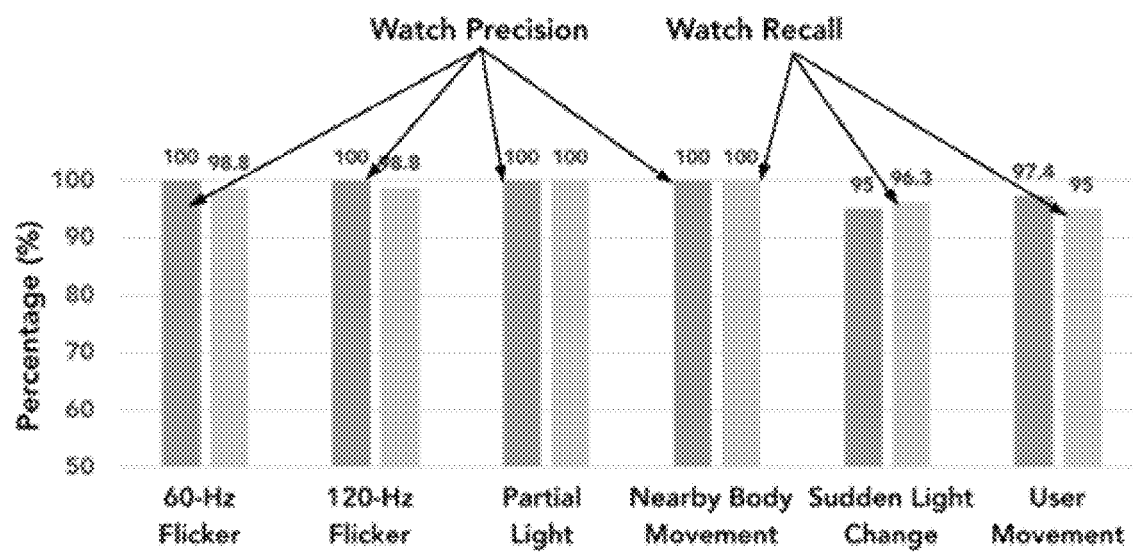

The prototypes were tested in more challenging scenarios, where the ambient light fluctuates. FIGS. 15A and 15B illustrate the accuracy of gesture recognition under ambient light fluctuations for all scenarios. Five possible causes for light fluctuation were examined, including luminary flickering, partial light blockage, moving shadow from a nearby people, sudden global light change, and user movement.

Flicker Effect

The flicker effect appears in some indoor luminaries driven by alternating current. In this study, the prototypes were tested in two offices (light intensity around 600 lux), each has a flickering luminary one flashing at approximately 60 Hz and another one at 120 Hz. The flicker frequency is measured by an OWON oscilloscope. FIG. 15 shows that the prototypes achieve 100% precision and 97-98% recall. It demonstrates that the CFAR method can effectively remove the high-frequency flickering signals and precisely detects the photodiodes blocked by the nearby finger in the midair. A light flickering at around 30 Hz can significantly affect performance of the system since it is close to the sampling rate (35 Hz). However, 30 Hz flickering light is rare in the indoor environments because it is noticeable by naked eyes.

Partial Light Difference

Then situations where the photodiodes are exposed to nonuniform light intensities were tested. A polarizer is placed on the prototypes, resulting half of the photodiodes under 900-lux while the other half under 400 lux. As shown in FIGS. 15A and 15B, the precision and recall remain 100% and 98%, respectively. Such high accuracy is primarily because of the CFAR algorithm, where each photodiode uses its own dynamic thresholding. As a result, blockage detection is not affected by the nonuniform light intensity across the photodiodes.

Nearby Body Movement

Next, the impact of nearby body movement is tested on recognition accuracy. Someone passing near the user may cast shadow on the photodiodes, thus causing false positives. In this experiment, another participant is recruited as a distractor, who walks in random trajectories near the user wearing the devices or wave the hands 30 cm away from the prototypes. The result shows that the movement of a nearby person has negligible impact on recognition accuracy. This is because the system's sensing range is approximately between 0.5 cm to 3 cm. A finger in such close distance can block a sufficient amount of light to cause noticeable dips in harvested power. Whereas, objects further away from photodiodes block far less light and have little interference with the gesture sensing.

Sudden Light Change

The impact of drastic, sudden ambient light change is examined on the recognition accuracy. The experiment is conducted in an office illuminated by multiple floor lamps. A participant wears the prototypes on at a time when performing the gestures, during which one floor lamp is turned on and off at roughly 1-3 Hz. This introduces quick change of light intensity oscillating between 550 lux and 800 lux measured at the photodiodes. Results show that the systems still achieve high precision (96.7% for glasses and 95% for watch) and recall (97% for glasses and 96.3%). It demonstrates that the method can effectively identify the global light change and subtract it from gesture recognition. As a result, it filters out the sudden global light change and detects midair gesture correctly.

User Movement

Finally, the prototypes is tested during user movements. A participant performs the gestures with the prototypes when walking in a hallway, where light distributes nonuniformly, ranging between 500 lux and 1K lux. The results show that the glasses prototype achieves 100% precision and 97% recall. The recall accuracy decreases because participant occasionally performs the gestures outside the device's sensing range (e.g., 3 cm). The watch achieves 97.4% precision and 95% recall. Four out of eighty midair gestures are classified incorrectly, possibly caused by the nearby shadows when moving.

Figure 16A:
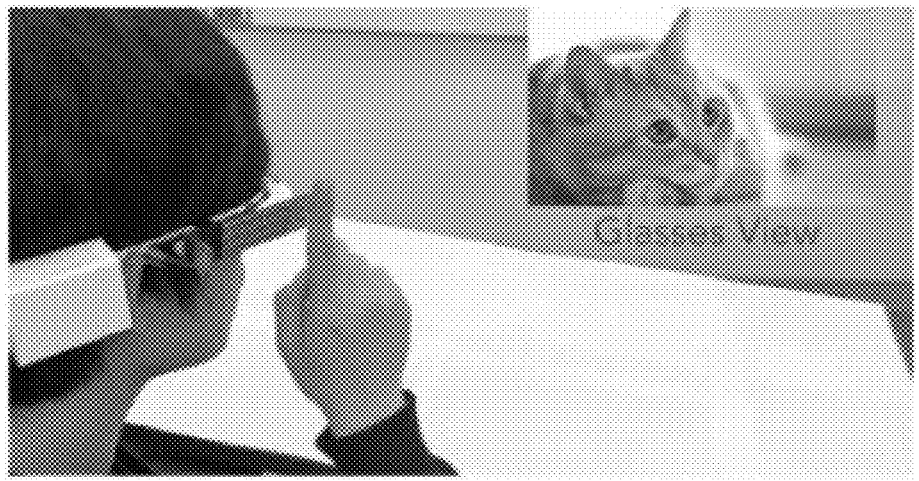
FIGS. 16A and 16B illustrate demo applications: (a) a user swipes finger to browse websites (b) a user plays game on smartwatch.

Two demo applications were implemented to showcase the self-powered system's potential on wearable devices. The first application allows the user to interact with a head-worn display using the midair and touch gestures. The glasses frame prototype is placed on a Google Glass's touchpad. With the glasses frame, most of conventional touch gestures can be implemented and additional midair swipe gestures are also supported. More gestures can be added which will be discussed in future work. In addition, the system provides a successful self-powered solution to battery-limited smart devices and it can even power other units on smart devices. In the application, a midair swipe gesture is a shortcut for page turning while browsing websites with smart-glasses (FIG. 16A).

Figure 16B:
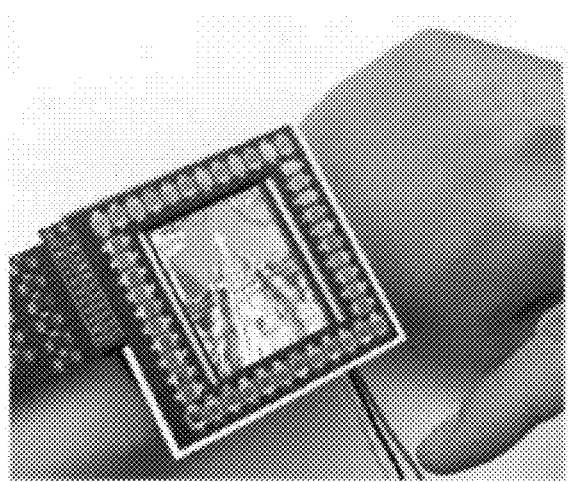

The second application is an additional controller on smartwatch with the watch bezel prototype. A smartwatch prototype was created using a 2" TFT display, a 3D printed case, and the watch bezel. In this application, the user can interact with the smartwatch in midair or touching the bezel. This provides an external and freedom way and has two potential benefits. First, users can set the limited buttons on the original smartwatch for some important functions, such as answering the phone and activating intelligent personal assistant. Other minor function can set on the self-powered watch bezel, such as muting the device and rotating the screen. Second, the system provides a midair solution to extend the interactive area of the screen-limited smartwatch. For example, the user can swipe the finger to play mobile games on the smartwatch (FIG. 16B).

Advantages

A comparison is made between disclosed embodiments and related work in low-power gesture sensing, visible light sensing and midair gesture sensing in general.

Low-Power Gesture Sensing

Existing studies have explored various sensing modalities for low-power gesture sensing. Examples include innovative sensing with electric fields, TV or RFID signals, pressure and capacitive sensors. See Cohn et al.; Kellogg et al.; Dementyev et al.; Troung et al.; and Andreas Braun, Reiner Wichert, Arjan Kuijper, and Dieter W. Fellner. 2015. Capacitive proximity sensing in smart environments. *Journal of Ambient Intelligence and Smart Environments* 7, 4: 483-510. doi.org/10.3233/AIS-150324, each incorporated herein by reference in their entirety. In particular, Gabe Cohn et al presented an ultra-low-power method for passively sensing body motion using static electric fields by measuring the voltage at any single location on the body. See Cohn et al. Its components consume 6.6 µW. WristFlex uses an array of force sensitive resistors to distinguish subtle finger pinch gestures. The sensors alone consume 60.7 µW. See Dementyev et al. Allsee recognizes hand gestures by examining its reflection of existing wireless signals, e.g. TV or RFID signals. See Kellogg et al. (2014). Its ADC consumes 27-29 µW. Eliminating ADC by comparators can further drive down the power to 4.57-5.85 µW.

Disclosed embodiments relate to a different medium. The disclosed sensing component alone (photodiodes and control circuits) consumes lower power (1.8 µW for the glasses and 3.5 µW for the watch) than that of some prior systems. See Dementyev et al. Optimization similar to Kellogg et al. may be considered to eliminate ADC to further reduce power consumption. See Kellogg et al. (2014). More importantly, the disclosed sensing component also harvests power to drive the whole gesture recognition module including the micro-controller running the recognition algorithm. The high energy density of light allows more energy to be harvested compared to other medium and the surplus energy can drive other components of the device.

Visible Light Sensing

Active research has studied the use of visible light for indoor localization, coarse-grained body sensing and LED-based finger tracking. See Parth et al.; Shahid Ayub, Sharadha Kariyawasam, Mahsa Honary, and Bahram Honary. 2013. Visible light ID system for indoor localization. *Wireless, Mobile and Multimedia Networks (ICWMMN 2013), 5th IET International Conference on:* 254-257. doi.org/10.1049/cp.2013.2419; Naveed U L Hassan, Aqsa Naeem, and Muhammad Adeel Pasha. 2014. Indoor Positioning Using Visible LED Lights: A Survey. *ACM Transactions on Sensor Networks* 11, 2: 1-24. doi.org/10.1145/0000000.000000; Shang Ma, Qiong Liu, and Phillip C. Y. Sheu. 2018. Foglight: Visible Light-Enabled Indoor Localization System for Low-Power IoT Devices. *IEEE Internet of Things Journal* 5, 1: 175-185. doi.org/10.1109/JIOT.2017.2776964; Liang Yin, Xiping Wu, and Harald Haas. 2016. Indoor visible light positioning with angle diversity transmitter. In 2015 *IEEE 82nd Vehicular Technology Conference, VTC Fall 2015—Proceedings.* doi.org/

10.1109/VTCFall.2015.7390984; Chi Zhang and Xinyu Zhang. 2016. LiTell: Robust Indoor Localization Using Unmodified Light Fixtures. *Proceedings of the 22nd Annual International Conference on Mobile Computing and Networking—MobiCom* '16: 230-242. doi.org/10.1145/2973750.2973767; Tianxing Li, Chuankai An, Zhao Tian, Andrew T. Campbell, and Xia Zhou. 2015. Human Sensing Using Visible Light Communication. In *Proceedings of the 21st Annual International Conference on Mobile Computing and Networking—MobiCom* '15, 331-344. doi.org/10.1145/2789168.2790110; Tianxing Li, Qiang Liu, and Xia Zhou. 2016. Practical Human Sensing in the Light. In *Proceedings of the 14th Annual International Conference on Mobile Systems, Applications, and Services—MobiSys* '16, 71-84. doi.org/10.1145/2906388.2906401; Varshney et al.; Xia Zhou and Andrew T. Campbell. 2014. Visible light networking and sensing. *HotWireless 2014—Proceedings of the 1st ACM MobiCom Workshop on Hot Topics in Wireless:* 55-59. doi.org/10.1145/2643614.2643621; Michal Karol Dobrzynski, Ramon Pericet-Camara, and Dario Floreano. 2012. Vision tape-a flexible compound vision sensor for motion detection and proximity estimation. *IEEE Sensors Journal* 12, 5: 1131-1139. doi.org/10.1109/JSEN.2011.2166760; Steve Hodges, Shahram Izadi, Alex Butler, Alban Rrustemi, and Bill Buxton. 2007. ThinSight. *Proceedings of the 20th annual ACM symposium on User interface software and technology—UIST* '07: 259. doi.org/10.1145/1294211.1294258; J. Kim, S. Yun and Y. Kim. 2016. Low-power motion gesture sensor with a partially open cavity package. *Opt. Express* 24: 10537-10546; Satoshi Tsuji. 2012. A tactile and proximity sensor by optical and electrical measurement. In *Proceedings of IEEE Sensors.* doi.org/10.1109/ICSENS.2012.6411050; and Chi Zhang, Josh Tabor, Jialiang Zhang, and Xinyu Zhang. 2015. Extending Mobile Interaction Through Near-Field Visible Light Sensing. In *Proceedings of the 21st Annual International Conference on Mobile Computing and Networking—MobiCom* '15, 345-357. doi.org/10.1145/2789168.2790115, each incorporated herein by reference in their entirety. For achieving higher sensing accuracy, most systems have used photodiodes in the photoconductive mode. Additionally, most designs require active modulation of the light source. The disclosed work differs in that it uses photodiodes in the photovoltaic mode and exploit the changes in harvested power for gesture sensing. Disclosed embodiments work with existing ambient light without the need to modulate the light source.

Photodiode's photovoltaic mode has been exploited by prior works. Varshney et al. pairs a solar cell with a thresholding circuit to sense binary blockage information. See Ambuj Varshney, Andreas Soleiman, Luca Mottola, and Thiemo Voigt. 2017. Battery-free Visible Light Sensing. In *Proceedings of the 4th ACM Workshop on Visible Light Communication Systems—VLCS* '17, 3-8. doi.org/10.1145/3129881.3129890, incorporated herein by reference in its entirety. It then sends the information via backscatter communication to another machine that runs the gesture detection algorithm. It supports three hand gestures. The sensing and communication consumes 20 µW. With a fixed thresholding circuit, it is challenging for the system to adapt to various ambient light conditions. In comparison, disclosed embodiments use arrays of photodiodes for gestures sensing and an algorithm for robust gesture detection in diverse ambient light conditions. Disclosed embodiments relate to a standalone module that runs the gesture recognition algorithm. The power harvested by photodiodes drives the whole module. Nayar et al. exploit photodiode's photovoltaic mode for both sensing and energy harvesting and study the feasibility of building self-powered image sensors. See Nayar et al. Disclosed embodiments relate to a self-powered gesture recognition module and two complete prototypes that demonstrate its feasibility.

Midair Gesture Sensing

Midair gesture is one of an effective solution to extend the interaction space. See Roland Aigner, Daniel Wigdor, Hrvoje Benko, Michael Haller, David Lindlbauer, Alexandra Ion, Shengdong Zhao, and Jeffrey Tzu Kwan Valino Koh. 2012. Understanding Mid-Air Hand Gestures: A Study of Human Preferences in Usage of Gesture Types for HCI. *Tech. Rep. MSR-TR*-2012-11: 10. Retrieved from www.microsoft.com/en-us/research/publication/understanding-mid-air-hand-gestures-a-study-of-human-preferences-in-usage-of-gesture- types-for-hci/, incorporated herein by reference in its entirety. A variety of sensing techniques have been developed to detect midair gestures. They have considered the use of cameras, infrared sensors, WiFi signal, GSM signals and other wearable sensors. See Xiang 'Anthony' Chen, Julia Schwarz, Chris Harrison, Jennifer Mankoff, and Scott E. Hudson. 2014. Air+Touch: Interweaving Touch & In-Air Gestures. *Proceedings of the ACM Symposium on User Interface Software and Technology, UIST* 2014: 519-525. doi.org/10.1145/2642918.2647392; Andrea Colaço, Ahmed Kirmani, Hye Soo Yang, Nan-Wei Gong, Chris Schmandt, and Vivek K. Goyal. 2013. Mime: Compact, Low-Power 3D Gesture Sensing for Interaction with Head-Mounted Displays. *Proceedings of the 26th annual ACM symposium on User interface software and technology—UIST* '13: 227-236. doi.org/10.1145/2501988.2502042; Kwangtaek Kim, Joongrock Kim, Jaesung Choi, Junghyun Kim, and Sangyoun Lee. 2015. Depth camera-based 3D hand gesture controls with immersive tactile feedback for natural mid-air gesture interactions. *Sensors (Switzerland)* 15, 1: 1022-1046. doi.org/10.3390/s150101022; Yi Li. 2012. Hand gesture recognition using Kinect. *Software Engineering and Service Science (ICSESS)*, 2012 *IEEE 3rd International Conference on:* 196-199. doi.org/10.1109/ICSESS.2012.6269439; Mingyu Liu, Mathieu Nancel, and Daniel Vogel. 2015. Gunslinger: Subtle Arms-Down Mid-Air Interaction. In *Proceedings of the 28th Annual ACM Symposium on User Interface Software & Technology—UIST* '15, 63-71. doi.org/10.1145/2807442.2807489; Jie Song, Gábor Sörös, Fabrizio Pece, Sean Ryan Fanello, Shahram Izadi, Cem Keskin, and Otmar Hilliges. 2014. In-air gestures around unmodified mobile devices. In *Proceedings of the 27th annual ACM symposium on User interface software and technology—UIST* '14, 319-329. doi.org/10.1145/2642918.2647373; Danhang Tang, Tsz Ho Yu, and Tae Kyun Kim. 2013. Real-time articulated hand pose estimation using semi-supervised transductive regression forests. In *Proceedings of the IEEE International Conference on Computer Vision*, 3224-3231. doi.org/10.1109/ICCV.2013.400; Juan Pablo Wachs, Mathias Kölsch, Helman Stern, and Yael Edan. 2011. Vision-based hand-gesture applications. *Communications of the ACM* 54, 2: 60. doi.org/10.1145/1897816.1897838; Xing-Dong Yang, Tovi Grossman, Daniel Wigdor, and George Fitzmaurice. 2012. Magic Finger: Always-Available Input through Finger Instrumentation. *Proceedings of the 25th annual ACM symposium on User interface software and technology—UIST* '12: 147-156. doi.org/10.1145/2380116.2380137; Alex Butler, Shahram Izadi, and Steve Hodges. 2008. SideSight: Multi-"touch" interaction around small devices. *UIST '08: Proceedings of the 21st annual ACM symposium on User interface software and technology* 23, 21: 201-204. doi- .acm.org/10.1145/1449715.1449 746; Jun Gong, Yang Zhang, Xia Zhou and Xing-Dong Yang. 2017. Pyro: Thumb-Tip Gesture Recognition Using Pyroelectric Infrared Sensing. In *Proceedings of the 30th Annual ACM Symposium on User Interface Software and Technology (UIST '17)*, 553-563; Kim et al; Sven Kratz and Michael Rohs. 2009. Hoverflow: exploring around-device interaction with IR distance sensors. . . . *on Human-Computer Interaction with Mobile Devices* . . . , FIG. 1: 1-4. doi.org/10.1145/1613858.1613912; Shenwei Liu and F Guimbretière. 2012. FlexAura: a flexible near-surface range sensor. *Proc. UIST.* doi.org/10.1145/2380116.2380158; Masa Ogata, Yuta Sugiura, Hirotaka Osawa, and Michita Imai. 2012. iRing: Intelligent Ring Using Infrared Reflection. In *Proceedings of the 25th annual ACM symposium on User interface software and technology—UIST '12*, 131-136. doi.org/10.1145/2380116.2380135; Dongseok Ryu, Dugan Urn, Philip Tanofsky, Do Hyong Koh, Young Sam Ryu, and Sungchul Kang. 2010. T-less: A novel touchless human-machine interface based on infrared proximity sensing. In *IEEE/RSJ 2010 International Conference on Intelligent Robots and Systems, IROS 2010—Conference Proceedings*, 5220-5225. doi.org/10.1109/IROS.2010.5649433; Withana et al.; Braun et al.; Qifan Pu, Sidhant Gupta, Shyamnath Gollakota, and Shwetak Patel. 2013. Whole-home gesture recognition using wireless signals. In *Proceedings of the 19th annual international conference on Mobile computing & networking—MobiCom '13*, 27. doi.org/10.1145/2500423.2500436; Li Sun, Souvik Sen, Dimitrios Koutsonikolas, and Kyu-Han Kim. 2015. WiDraw: Enabling Hands-free Drawing in the Air on Commodity WiFi Devices. In *Proceedings of the 21st Annual International Conference on Mobile Computing and Networking—MobiCom '15*, 77-89. doi.org/10.1145/2789168.2790129; Bei Yuan and Eelke Folmer. 2008. Blind hero: enabling guitar hero for the visually impaired. *Proceedings of the 10th international ACM SIGACCESS conference on Computers and accessibility:* 169-176. doi.org/10.1145/1414471.1414503; Chen Zhao, Ke-Yu Chen, Md Tanvir Islam Aumi, Shwetak Patel, and Matthew S. Reynolds. 2014. SideSwipe. In *Proceedings of the 27th annual ACM symposium on User interface software and technology—UIST '14*, 527-534. doi.org/10.1145/2642918.2647380; Sidhant Gupta, Daniel Morris, Shwetak Patel, and Desney Tan. 2012. SoundWave: Using the Doppler Effect to Sense Gestures. *Proceedings of the 2012 ACM annual conference on Human Factors in Computing Systems—CHI '12:* 1911-1914. doi.org/10.1145/2207676.2208331; Jaime Lien, Nicholas Gillian, M Emre Karagozler, Patrick Amihood, Carsten Schwesig, Erik Olson, Hakim Raja, Ivan Poupyrev, and Google Atap. 2016. Soli: Ubiquitous Gesture Sensing with Millimeter Wave Radar. *ACM Trans. Graph. Article* 35, 10: 1-19. doi.org/10.1145/2897824.2925953; and Anders Markussen, Mikkel Rønne Jakobsen, and Kasper Hornbæk. 2014. Vulture: a mid-air word-gesture keyboard. *Proceedings of the 32nd annual ACM conference on Human factors in computing systems—CHI '14:* 1073-1082. doi.org/10.1145/2556288.2556964, each incorporated herein by reference in their entirety. Camera-based methods are commonly used by existing products such as Xbox Kinect, Leap Motion, PointGrab and CrunchFish. See Xbox Kinect. www.xbox.com/en-US/kinect; Leap Motion. www.leapmotion.com/; Point Grab. www.pointgrab.com/; and Crunch Fish. crunchfish.com/, each incorporated herein by reference in their entirety. These methods often involve higher computational overhead. In comparison, disclosed embodiments detect midair gestures with a much more lightweight algorithm and the gesture recognition module requires no external power input. SideSight and FlexAura require multiple (10 in SideSight, 384 in FlexAura) infrared emitters. Each emitter in SideSight/FlexAura consumes 165/180-mW peak power. See Butler et al; and Liu et al. Latest infrared proximity sensors (e.g., APDS 9130, APDS 9190) consume 140-157 µW at 20 Hz sampling rate. See APDS-9130. www.broadcom.com/products/optical-sensors/proximity-sensors/apds-9130; and APDS-9190. www.broadcom.com/products/optical-sensors/proximity-sensors/apds-9190, each incorporated herein by reference in their entirety. In comparison, disclosed embodiments passively reuse ambient light and powers themselves as a complete module.

Additional Embodiments

Enriching Sensing Capabilities. As a proof of concept, disclosed prototypes are built for recognizing a small set of simple finger gestures (FIG. 5). The system principle, however, can be extended to recognize a richer set of gestures. Touch-related gestures can be expanded by including multi-touch, rotating or sliding fingertips on the photodiodes. These gestures can be used to create self-powered interaction buttons on any energy-limited devices. As for midair gestures, finger drawing various shapes (e.g., circle, rectangle, triangle, tick, cross) or numbers may be added. Various lightweight machine learning algorithms (e.g., kNN, boosted trees) may be incorporated to classify these more sophisticated movement trajectories. These learning models can be trained with data collected across participants. Furthermore, current midair gestures mainly differ in finger movement direction. Moving forward, movement distance may be inferred based on the sequence of blocked photodiodes. The recognition of movement distance can enable finer-grained input control, e.g., tuning down/up volume, adjusting screen brightness. Moreover, the disclosed glasses prototype recognizes the horizontal movement of a midair finger, because the photodiodes in each vertical column are connected in series as a unit, mainly to ease the arrangement of SPDT switches on the back of the circuit board. The disclosed circuit design may be modified to connect fewer photodiodes in series to sense vertical movement. A modified circuit can enable a richer set of finger gestures to interact with the glasses.

Hardware Optimization. The power consumption of the disclosed prototypes can be further reduced with following hardware optimization. First, disclosed embodiments use a micro-controller's built-in ADC to ease the programming and debugging. To further reduce power, external lower-power ADCs, such as ads7042 (<1 µW at 1 kSPS) may be used. See ads7042. www.ti.com/lit/ds/symlink/ads7042.pdf, incorporated herein by reference in its entirety. Furthermore, for the recognition of gestures (e.g. touch) requiring fixed thresholding, the ADC may be replaced with low-power comparators that directly compare analog signals for gesture recognition. See Kellogg et al. (2014). It will greatly lower system power given that ADC currently consumes 30-40% of power. Second, the disclosed micro-controller is a development board that embeds many units unnecessary for gesture recognition. A customized computing unit with only relevant calculation units can further lower the power consumption of running the gesture recognition algorithm (currently consuming 55-65% of power). Third, the disclosed prototypes directly use an internal timer to control the sampling rate. An external timer may be used to achieve lower power. See Bryce Kellogg, Vamsi Talla, Joshua R. Smith, and Shyamnath Gollakot. 2017. PASSIVE WI-FI: Bringing Low Power to Wi-Fi Transmissions. *GetMobile: Mobile Computing and Communications* 20, 3: 38-41.

doi.org/10.1145/3036699.3036711, incorporated herein by reference in its entirety. Finally, the whole system may be implemented as an integrated circuit with all hardware components, including customized ultra-low power MCU, ADC/comparator units and switches. This can further minimize the total power consumption.

On the energy-harvesting side, the photodiodes (BPW 34) in the disclosed prototypes have 21% energy conversion efficiency, thus an individual photodiode can harvest a few microwatts under indoor lighting. It results in 44/48 photodiodes needed in the watch/glasses prototypes, contributing to their bulky looks. The disclosed prototype may be minimized in two directions. First, in disclosed prototypes only 39% of the photodiode surface (18 mm2) is used for sensing. Optimizing the fabrication of photodiodes and their arrangement can reduce the actual photodiode array size for harvesting the same amount of power. Second, with advances in the materials of photodiodes and mini solar cells, photodiodes with higher energy conversion ratios may be used. For example, advanced organic solar cells can achieve energy conversion ratio of 50%. See Shigeo Asahi, Haruyuki Teranishi, Kazuki Kusaki, Toshiyuki Kaizu, and Takashi Kita. 2017. Two-step photon up-conversion solar cells. *Nature Communications* 8. doi.org/10.1038/ncomms14962, incorporated herein by reference in its entirety. Using photodiodes with higher energy conservation ratios can lead to fewer cells to realize the same functionality or enhanced gesture recognition ability with the same number of cells. Moreover, arrays of more efficient photodiodes can harvest more energy to better support energy-constrained or battery-free devices.

Other Prototype Examples. Disclosed embodiments use the smart watch and glasses as two examples to ease the prototyping. The disclosed embodiments are generalizable and can be integrated into other types of devices. Disclosed embodiments may be integrated into emerging battery-free systems. See Dierk et al.; Grosse-Puppendahl et al.; Tianxing Li, Qiang Liu and Xia Zhou. 2017. Ultra-Low Power Gaze Tracking for Virtual Reality. In *the 15th ACM Conference on Embedded Network Sensor Systems* (*SenSys* '17). doi.org/doi.org/10.1145/3131672.3131682; Naderiparizi et al.; Nayar et al.; and Talla et al., each incorporated herein by reference in their entirety.

In these systems, energy harvesters are the must-have components and disclosed embodiments may simultaneously provide gestural input with minimal additional energy overhead.

Numerous modifications and variations of the present invention are possible in light of the above teachings. It is therefore to be understood that within the scope of the appended claims, the invention may be practiced otherwise than as specifically described herein.

The invention claimed is:

1. A self-powered apparatus that senses multiple types of gestures, including a midair gesture and a touch gesture, the apparatus comprising:
    a plurality of photovoltaic devices, each operating in a photovoltaic mode and configured to convert ambient light into photocurrent;
    voltage-reading circuitry connected to each photovoltaic device of the plurality of photovoltaic devices to obtain a voltage reading for the photovoltaic device;
    energy-harvesting circuitry connected to each photovoltaic device of the plurality of photovoltaic devices to harvest energy to power the self-powered apparatus; and
    processing circuitry configured to
        determine that the touch gesture has been made by (1) determining, for each photovoltaic device of the plurality of photovoltaic devices, whether the voltage reading for particular photovoltaic device falls below a first predetermined threshold, and (2) analyzing locations of the photovoltaic devices for which the voltage reading fell below the first predetermined threshold, and
        determine that the midair gesture has been made by (1) determining, for each photovoltaic device in a subset of the plurality of photovoltaic devices, whether a midair blockage has occurred for the photovoltaic device, based on the voltage reading for the photovoltaic device, previous voltage readings for the photovoltaic device, and a second predetermined threshold, and (2) analyzing locations of the photovoltaic devices for which the midair blockage has occurred.

2. The self-powered apparatus of claim 1, wherein the processing circuitry is further configured to
    determine whether that a global light change occurred when detecting a change in a light-detected amount at each of the plurality of photovoltaic devices,
    when determining that the global light change occurred, calculate a global light change amount, and
    subtract the global light change amount from the voltage reading for each photovoltaic device of the plurality of photovoltaic devices before determining whether the midair blockage occurred at the photovoltaic device.

3. The self-powered apparatus of claim 2, wherein the processing circuitry is further configured to detect the global light change when there is a global decrease in light intensity, and determine the global light change amount as the change in the detected light-detected amount at a particular photovoltaic device of the plurality of photovoltaic device having a smallest decrease in the detected light-detected amount.

4. The self-powered apparatus of claim 2, wherein the processing circuitry is further configured to detect the global light change when there is a global increase in light intensity, and determine the global light change amount as the change in the detected light-detected amount at a particular photovoltaic device of the plurality of photovoltaic device having a largest increase in the detected light-detected amount.

5. The self-powered apparatus of claim 1, wherein the processing circuitry is further configured to determine, for each photovoltaic device in a subset of the plurality of photovoltaic devices, whether the midair blockage is detected for the photovoltaic device using a constant false alarm rate (CFAR) algorithm that considers the previous voltage readings prior to a current time, but does not consider voltage readings after the current time.

6. The self-powered apparatus of claim 1, further comprising a switch to switch an output of each photovoltaic device between the energy-harvesting circuitry and the voltage-reading circuitry,
    wherein the processing circuitry is further configured to control the switch to be connected to the voltage-reading circuitry at regular, periodic intervals.

7. The self-powered apparatus of claim 1, wherein the voltage-reading circuitry includes an A/D converter configured to convert a voltage for a respective photovoltaic device of the plurality of photovoltaic devices into the voltage reading for the respective photovoltaic device.

8. The self-powered apparatus of claim 1, wherein the plurality of photovoltaic devices are an array of photodiodes with multiple of the photodiodes connected in series as a unit, with the units being connected in parallel.

9. The self-powered apparatus of claim 1, wherein the energy-harvesting circuitry includes a power management component including a DC/DC converter and a capacitor to store surplus energy.

10. The self-powered apparatus of claim 1, wherein the processing circuitry is further configured to determine whether the touch gesture has been made, the touch gesture being one of a multi-touch gesture, a rotating gesture, and a sliding gesture.

11. The self-powered apparatus of claim 1, wherein the processing circuitry is further configured to detect movement based on light intensity changes of the plurality of photovoltaic devices.

12. The self-powered apparatus of claim 11, wherein the processing circuitry is further configured to recognize the midair gesture by classifying the detected movement.

13. The self-powered apparatus of claim 1, further comprising a plurality of comparators that compare analog voltage signals of the plurality of photovoltaic devices to the first predetermined threshold.

14. The self-powered apparatus of claim 1, wherein the processing circuitry is an integrated circuit.

15. The self-powered apparatus of claim 1, wherein the plurality of photovoltaic devices are an array of organic solar cells.

16. A smart watch including the self-powered apparatus of claim 1.

17. A pair of smart glasses including the self-powered apparatus of claim 1.

* * * * *